United States Patent
Kumagai et al.

(10) Patent No.: US 7,555,381 B2
(45) Date of Patent: Jun. 30, 2009

(54) TRAFFIC INFORMATION PROVIDING DEVICE, TRAFFIC INFORMATION PROVIDING SYSTEM, TRAFFIC INFORMATION TRANSMISSION METHOD, AND TRAFFIC INFORMATION REQUEST METHOD

(75) Inventors: Masatoshi Kumagai, Ibaraki (JP); Mariko Okude, Ibaraki (JP); Koichiro Tanikoshi, Ibaraki (JP)

(73) Assignee: Xanavi Informatics Corporation, Zama-shi (JP)

( * ) Notice: Subject to any disclaimer, the term of this patent is extended or adjusted under 35 U.S.C. 154(b) by 119 days.

(21) Appl. No.: 11/835,387

(22) Filed: Aug. 7, 2007

(65) Prior Publication Data

US 2008/0030371 A1 Feb. 7, 2008

(30) Foreign Application Priority Data

Aug. 7, 2006 (JP) ............................. 2006-214802

(51) Int. Cl.
*G08G 1/00* (2006.01)
(52) U.S. Cl. .................. 701/117; 340/934; 340/995.13
(58) Field of Classification Search .......... 701/117–119
See application file for complete search history.

(56) References Cited

U.S. PATENT DOCUMENTS

| 3,239,653 | A | * | 3/1966 | Barker | 701/118 |
|---|---|---|---|---|---|
| 3,239,805 | A | * | 3/1966 | Brockett | 340/934 |
| 3,389,244 | A | * | 6/1968 | Brockett | 701/118 |
| 5,173,691 | A | * | 12/1992 | Sumner | 340/905 |
| 5,182,555 | A | * | 1/1993 | Sumner | 340/905 |
| 5,812,069 | A | * | 9/1998 | Albrecht et al. | 340/905 |
| 5,822,712 | A | * | 10/1998 | Olsson | 701/117 |
| 6,222,836 | B1 | * | 4/2001 | Sekiyama et al. | 370/351 |
| 6,462,697 | B1 | * | 10/2002 | Klamer et al. | 342/36 |
| 6,466,862 | B1 | * | 10/2002 | DeKock et al. | 701/117 |
| 6,574,548 | B2 | * | 6/2003 | DeKock et al. | 701/117 |
| 6,785,606 | B2 | * | 8/2004 | DeKock et al. | 701/117 |
| 6,882,930 | B2 | * | 4/2005 | Trayford et al. | 701/117 |
| 7,143,442 | B2 | * | 11/2006 | Scarfe et al. | 726/23 |
| 7,167,795 | B2 | * | 1/2007 | Hirose et al. | 701/210 |
| 2002/0193938 | A1 | * | 12/2002 | DeKock et al. | 701/117 |
| 2003/0073406 | A1 | * | 4/2003 | Benjamin et al. | 455/41 |
| 2003/0225516 | A1 | * | 12/2003 | DeKock et al. | 701/214 |

(Continued)

FOREIGN PATENT DOCUMENTS

EP 0 921 509 A2 6/1999

(Continued)

OTHER PUBLICATIONS

European Search Report dated Nov. 5, 2007 (Seven (7) Pages).

(Continued)

*Primary Examiner*—Thomas G Black
*Assistant Examiner*—Shelley Chen
(74) *Attorney, Agent, or Firm*—Crowell & Moring LLP

(57) ABSTRACT

A probe center server (10) previously performs filtering to determine whether or not a projection norm of a link in a feature space can be interpolated, and notifies a probe terminal (20) to preferentially collect and upload detected probe data for the link whose missing data can not be interpolated.

6 Claims, 13 Drawing Sheets

U.S. PATENT DOCUMENTS

| | | | |
|---|---|---|---|
| 2004/0103021 A1* | 5/2004 | Scarfe et al. | 705/13 |
| 2005/0222755 A1* | 10/2005 | Tengler et al. | 701/201 |
| 2006/0025925 A1* | 2/2006 | Fushiki et al. | 701/210 |
| 2006/0058940 A1* | 3/2006 | Kumagai et al. | 701/117 |
| 2006/0064234 A1* | 3/2006 | Kumagai et al. | 701/117 |
| 2006/0206256 A1* | 9/2006 | Kumagai et al. | 701/117 |
| 2006/0242610 A1* | 10/2006 | Aggarwal | 716/1 |
| 2007/0208493 A1* | 9/2007 | Downs et al. | 701/117 |
| 2007/0208494 A1* | 9/2007 | Chapman et al. | 701/117 |
| 2007/0208495 A1* | 9/2007 | Chapman et al. | 701/117 |
| 2007/0208496 A1* | 9/2007 | Downs et al. | 701/117 |
| 2007/0208501 A1* | 9/2007 | Downs et al. | 701/119 |
| 2008/0030371 A1* | 2/2008 | Kumagai et al. | 340/905 |
| 2008/0046165 A1* | 2/2008 | Downs et al. | 701/117 |
| 2008/0071465 A1* | 3/2008 | Chapman et al. | 701/117 |
| 2008/0114529 A1* | 5/2008 | Hiruta et al. | 701/117 |

FOREIGN PATENT DOCUMENTS

| | | |
|---|---|---|
| JP | 7-129893 A | 5/1995 |
| JP | 2006-251941 A | 9/2006 |

OTHER PUBLICATIONS

Masatoshi Kumagai, et. al., "Realtime Interpolation Method for Probe Car System", IPSJ SIG technical reports, ITS, vol. 2005, No. 21 (20050310), pp. 67-73 (Abstract only).

* cited by examiner (a) FEATURE SPACE BASIS VECTORS BEFORE FILTERING IS PERFORMED
(b) SUBSPACE BASIS VECTORS AFTER FILTERING IS PERFORMED (a) CURRENT INFORMATION
(b) STATISTICAL INFORMATION
(c) MERGED INFORMATION

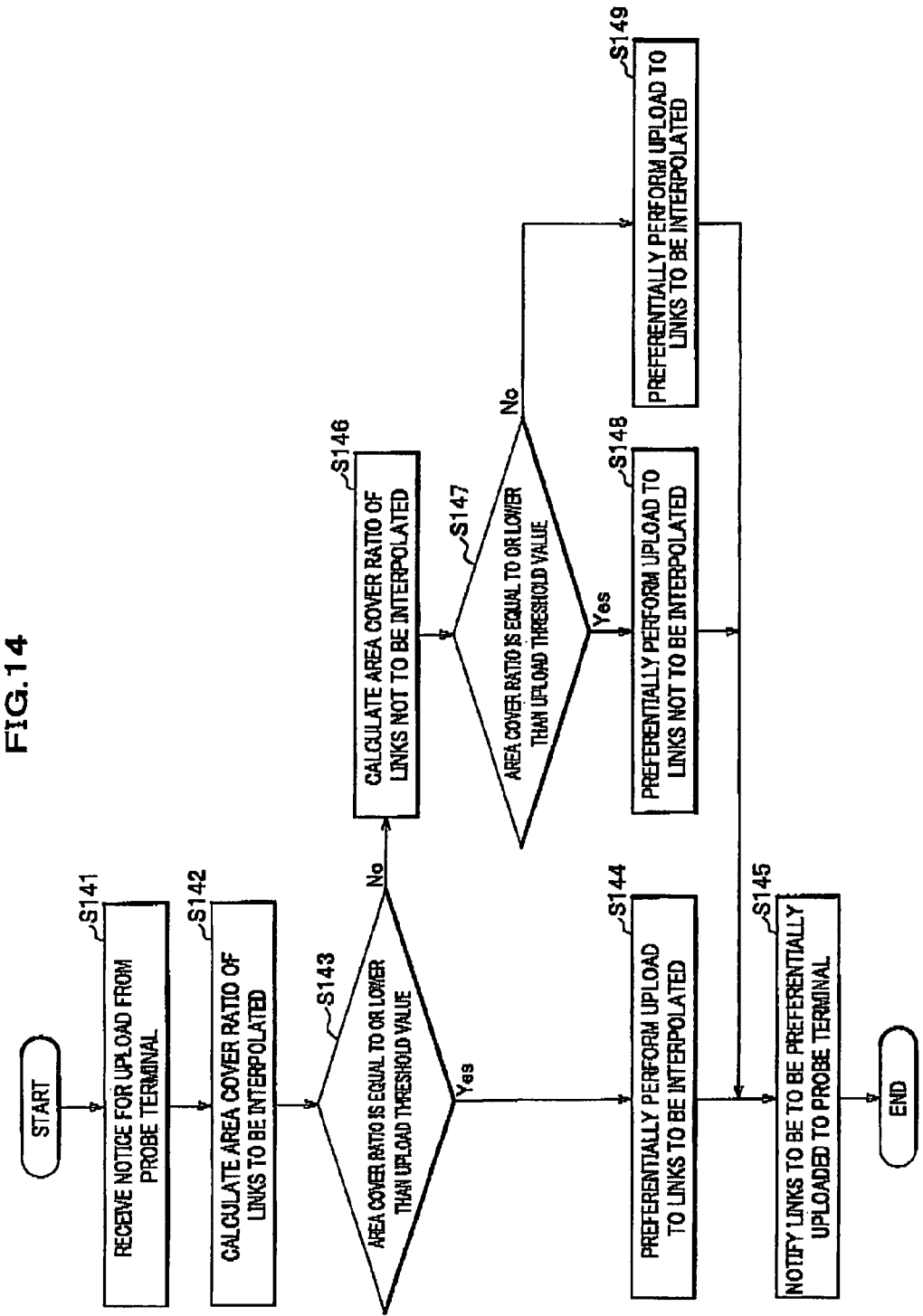

TRAFFIC INFORMATION PROVIDING DEVICE, TRAFFIC INFORMATION PROVIDING SYSTEM, TRAFFIC INFORMATION TRANSMISSION METHOD, AND TRAFFIC INFORMATION REQUEST METHOD

CROSS-REFERENCE TO RELATED APPLICATION(S)

This application claims the foreign priority benefit under Title 35, United States Code, §119 (a)-(d), of Japanese Patent Application No. 2006-214802 filed on Aug. 7, 2006 in the Japan Patent Office, the disclosure of which is herein incorporated by reference in its entirety.

BACKGROUND OF THE INVENTION

1. Field of the Invention

The present invention relates to a traffic information providing device, a traffic information providing system, a traffic information transmission method and a traffic information request method capable of estimating and interpolating missing data of probe data (traffic information) in real time and providing comprehensive estimating/interpolating information to probe terminals.

2. Description of the Related Art

The purpose of a traffic information service is to inform drivers the congested places, to guide the drivers along an optimal route, and to estimate required time. Further, from a societal perspective, environmental load can be reduced and economic losses caused by road traffic congestion can be restricted by effectively utilizing limited route resources and keeping demand-and-supply balance.

When the traffic information service was firstly started, the service was limited to provide current traffic information for a specified road district. Today, the traffic information service is extended and diversified into various styles. The traffic information service is extended mainly into two directions. One is the extension in time which is achieved by providing predicted traffic information. By using the predicted traffic information, it becomes possible to select the optimal route and estimate the required time even for a long distance driving or a long-term delivery plan. The other one is the extension in space which is achieved by widening the area where the traffic information is provided by employing probe cars. Owing to the probe cars, even the traffic information of the routes (links) uncovered by existing road sensors can be collected and provided, so that the service can be provided effectively.

Herein the traffic information means travel time of the links, for example.

Similar to a VICS (Vehicle Information and Communication System), each probe car serves as a sensor, and therefore can collect the traffic information independently without depending on road infrastructure, and basically can provide traffic information of all routes. However, since the travel position of the probe car is random, and since the timing when the probe data (the data transmitted by the probe car) is transmitted to the probe data center are random, the quality of the information is quite different from the continuous data collected by the road sensors, namely, the data includes a large amount of missing data in time series and space series.

For example, if there are 100,000 probe cars in the whole Japan, then the probe data can be generated at a time density of around one per hour for each link. Compared to the data acquired by the road sensors, which acquire data at a time pitch of five minutes, the rate of missing data is up to 80% to 90%. In order to make use of the sparse probe data as a complementary information source to the data acquired by the road sensor, some kind of data interpolating technique is needed.

As a technique for interpolating the missing traffic information data of the links based on the traffic information data collected by the road sensors of the other links, there has been known an art in which, for example, traffic information of the links having missing data is estimated based on the traffic information of the upstream links and downstream links connected with the links to be interpolated, or based on the traffic information of the links parallel to the links to be interpolated (see Japanese Patent Laid-Open Publication No. Hei07-129893, paragraphs [0012] to [0038], FIG. 1 and the others).

Further, there also has been known an art in which the missing data of the traffic information of the links is estimated and interpolated by generating, based on the past probe data, a feature space which expresses the correlation among a plurality of links, and projecting current probe data to the feature space in accordance with its missing data. The merit of the method of estimating and interpolating the missing data by performing projection in feature space is that it is possible to use various correlated information contained in the past probe data to perform interpolation by decomposing the traffic information into components which are correlated among the plurality of links, calculating the interpolation data for each component, and combining the interpolation data for each components (see Japanese Patent Laid-Open Publication No. 2005-64767, paragraph [0007], FIG. 1, and "Real-time Interpolation Method for Probe Car System", Masatoshi Kumagai et al., *IPSJ SIG technical reports. ITS.* Vol. 2005. No. 21 (20050310) pp. 67-73.

However, according to the art disclosed in the Japanese Patent Laid-Open Publication No. Hei07-129893, when the rate of the missing data of the probe data (the rate of missing data) becomes high, there are links whose probe data can not be acquired. For this reason, it is not possible to estimate the traffic information among the plurality of links based on such probe data. In other words, when the rate of missing data of the probe data becomes high (namely when the number of the links whose missing current traffic information is increased), there is strong possibility that all information of the links around the link to be interpolated is unknown, so that the interpolation based on the surrounding links is impossible. Further, even in the case where the missing data of the traffic information of a certain link can be estimated based on the surrounding links, when connection relation of the links is complicated, the precision of the estimation will become significantly low, so that the estimated information will significantly diverge from the current traffic information.

Though it will be possible to estimate the missing data of the link having high rate of missing data by using statistically processed past probe data, the statistically processed probe data reflects the past data after all, it does not necessarily reflect the current information.

On the other hand, according to the arts disclosed in the Japanese Patent Laid-Open Publication No. 2005-64767 and the "Intelligent Transport System", the traffic information of the links (the links with missing current traffic information) for which no current probe data (current traffic information) is collected can be estimated and interpolated from the collected current probe data of the links other than the links to be interpolated based on previously calculated correlated traffic information among the links.

Further, since the estimation and interpolation is performed without discriminating the links having low degree of correlation from the links having high degree of correlation, interpolation calculation will be unstable for the links having low degree of correlation. As a result, the information (including the current information and the interpolated information) for a specified link is apt to be missed. Moreover, since the degree of correlation of links can not be determined unless from the result of the estimation and interpolation, the fact that the links having low degree of correlation can not be estimated and interpolated can not be known until the estimation and interpolation is performed, so that the cover ratio of the area where the traffic information is provided can not be efficiently widened.

Herein, the "connection relation of the links" means the actual connection of the links, and the "correlation of links" means the case where the traffic information of a certain link affects the traffic information of the other links. For example, when the traffic information (travel time, for example) of link A increases, if the traffic information the other link B also increases along with the link A, then we say that the traffic information of the link A is in correlation with the traffic information of the link B. If the traffic information of the link B increase/decrease in no correlation with the traffic information of the link A, then we say that the traffic information of the link A is not in correlation with the traffic information of the link B.

Hereinafter, the traffic information of links in/not in correlation with each other is referred to as "the links in/not in correlation with each other", and the traffic information of links have high/low correlation with each other is referred to as "the links have high/low correlation with each other".

SUMMARY OF THE INVENTION

An object of the present invention to provide a traffic information providing device, a traffic information providing system, a traffic information transmission method and a traffic information request method in which a mechanism is provided which can previously discriminate the links having low degree of correlation from the links having high degree of correlation and provide estimating/interpolating data (also referred to as interpolating data), so that the cover ratio of an area where the traffic information is provided (an area cover ratio) can be widened.

In other words, an object of the present invention is to widen the area cover ratio of the traffic information by previously determining the degree of the correlation of the links, which serves as an indicator indicating whether or not the projective norm of the links to the feature space can be interpolated, and preferentially collecting the data for the links having low correlation.

According to an aspect of the present invention, a traffic information providing device is provided which generates, based on the traffic information history with missing data, a feature space which expresses correlation of a plurality of links, projects current traffic information to the feature space, and performs estimation and interpolation of the current traffic information based on correlation obtained by analyzing traffic information history by performing inverse projection from the feature space. As an indicator for determine whether or not a projection norm of a link in a feature space can be interpolated, the traffic information providing device previously performs filtering and notifies a probe terminal to preferentially collect and upload the current traffic information for the link whose missing data can not be interpolated.

BRIEF DESCRIPTION OF THE DRAWINGS

FIG. 14 is a flowchart explaining the operation of the traffic information providing system according to the second embodiment of the traffic information providing system.

DETAILED DESCRIPTION OF PREFERRED EMBODIMENT(S)

First Embodiment

Figure 1:
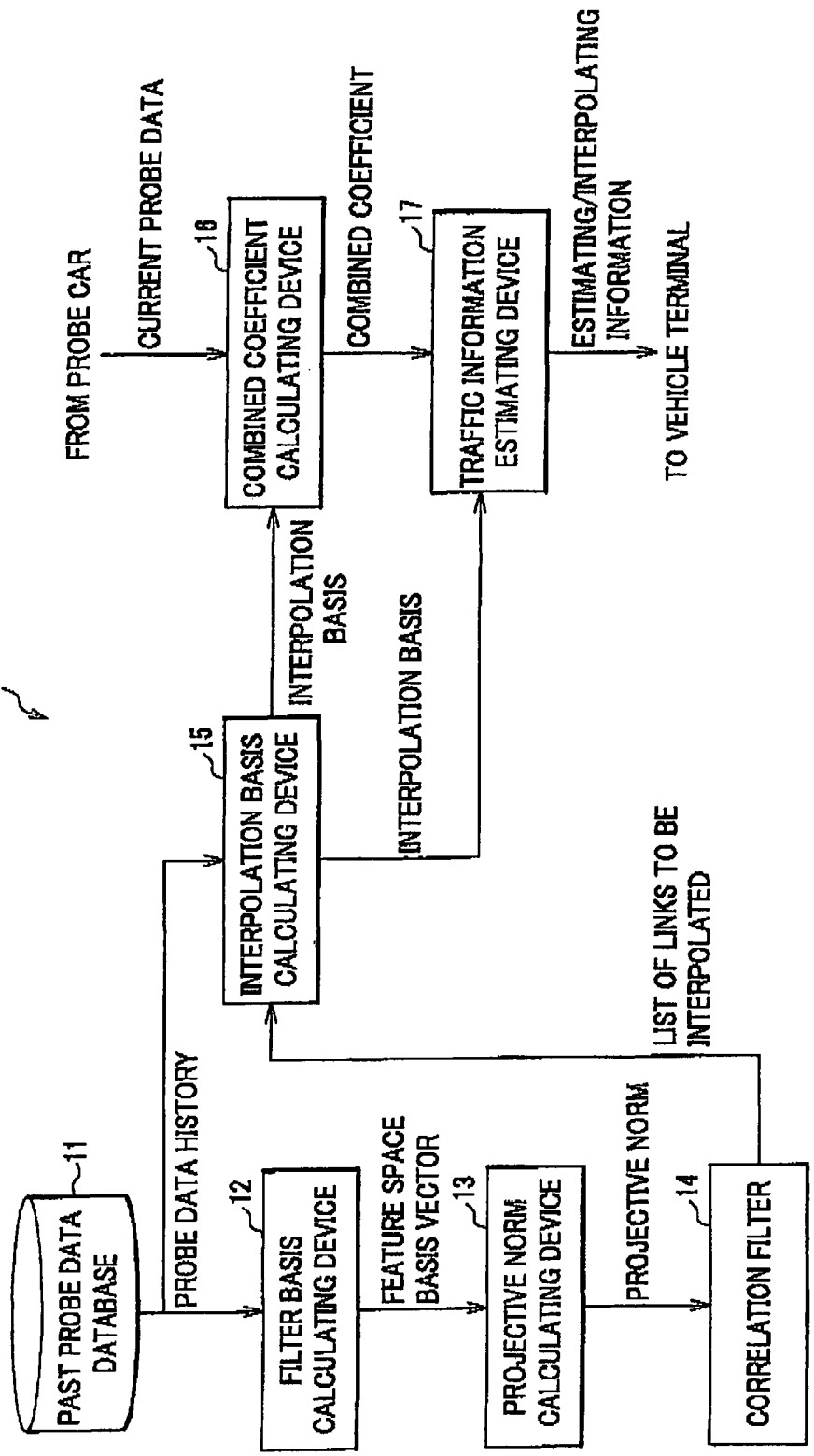
FIG. 1 is a block diagram showing the inner structure of a traffic information providing device according to a first embodiment of the present invention.

FIG. 1 is a block diagram showing the inner structure of a traffic information providing device according to a first embodiment of the present invention, the traffic information providing device being equipped in a probe data center, for example.

The traffic information providing device of the first embodiment includes a storage device (a past probe data database 11) and six calculating devices (a filter basis calculating device 12, a projective norm calculating device 13, a correlation filter 14, an interpolation basis calculating device 15, a combined coefficient calculating device 16, and a traffic information estimating device 17).

A lot of past probe data histories (traffic information histories) collected for a plurality of links in a specified area are stored in the past probe data database 11.

The probe data history is a time-series data group constituted by information about, for example, time stamp, link ID, travel time for each link, speed for each link, and degree of traffic congestion for each link.

The filter basis calculating device 12 acquires the probe data history with missing data of the plurality of links from the past probe data database 11, performs principal component analysis with missing data (PCAMD) so as to obtain components of traffic information which vary in relation to one another among the plurality of links, and outputs the obtained components of traffic information as bases of a feature space (i.e., feature space basis vectors) for a group of such links to the projective norm calculating device 13. Since the details about the principal component analysis with missing data has already been described in the aforesaid Japanese Patent Laid-Open Publication No. 2005-64767, paragraph [0007], FIG. 1 and "Intelligent Transport System", IPSJ SIG Notes, No. 20, March 2005, the description thereof will be skipped here.

Further, the projective norm calculating device 13 generates the feature space, which indicates correlation between the plurality of links, with the feature space basis vectors output by the filter basis calculating device 12 as axis vectors, calculates a norm of a projective vector in the feature space (i.e., a projective norm), and outputs the calculated projective norm to the correlation filter 14. The feature space basis vectors will be described later. Herein, the projective vector is formed by projecting a vector expressing links to be interpolated to the feature space. The projective norm can be calculated by calculating the angle between the vector (which expresses the links) and the feature space and obtaining the cosine of the vector by using the calculated angle.

The correlation filter 14 determines, based on the projective norm output by the projective norm calculating device 13, whether or not the missing data can be estimated and interpolated for each link, generates a list of links to be interpolated, and outputs the generated list to the interpolation basis calculating device 15.

Incidentally, the list of links to be interpolated herein lists the links whose projective norm exceeds an interpolation threshold value. The list of links to be interpolated lists at least a link number, and an interpolatability code (0: non-interpolatable, 1: interpolatable) for each link. The details will be described later.

Among the probe data histories stored in the past probe data database 11, the interpolation basis calculating device 15 performs the principal component analysis with missing data for the probe data histories of the links capable to be interpolated (such links are registered in the list of links to be interpolated output by the correlation filter 14). As a result of performing the principal component analysis with missing data, components of the traffic information are obtained which vary in relation to one another among the links to be interpolated. The interpolation basis calculating device 15 outputs the components of the traffic information to the combined coefficient calculating device 16 and the traffic information estimating device 17 as interpolation bases for the group of links.

Based on the current probe data acquired from probe cars (not shown), the combined coefficient calculating device 16 calculates combined coefficient bases based on the interpolation bases output from the interpolation basis calculating device 15. Based on the current probe data and the combined coefficient bases, the combined coefficient calculating device 16 calculates combined coefficients (which are weights for the combined coefficient bases) by performing weighting projection and outputs the calculated combined coefficients to the traffic information estimating device 17.

Herein, the combined coefficient bases are constituted by, among factors of the interpolation bases, only the factors corresponding to the links with no missing data in the current probe data.

Herein, the factors means factors of basis vectors (i.e., the components). For example, when the bases are constituted by a hundred of links, the components corresponding to such links are the factors. The details will be described later with reference to FIG. 2.

Based on the combined coefficients output by the combined coefficient calculating device 16, the traffic information estimating device 17 calculates an estimated value of the traffic information for interpolation (i.e., estimating/interpolating information) by linearly combining the interpolation bases output by the interpolation basis calculating device 15, and transmits the calculated the estimating/interpolating information to vehicle terminals.

Note that, since the details about the combined coefficient calculating device 16 and the traffic information estimating device 17 has already been described in the aforesaid Japanese Patent Laid-Open Publication No. 2005-64767 (see paragraph [0007], FIG. 1, etc.) in which the combined strength calculating device 104 corresponds the combined coefficient calculating device 16, and the traffic information estimating device 105 corresponds the traffic information estimating device 17, the description thereof will be skipped here.

Figure 2:
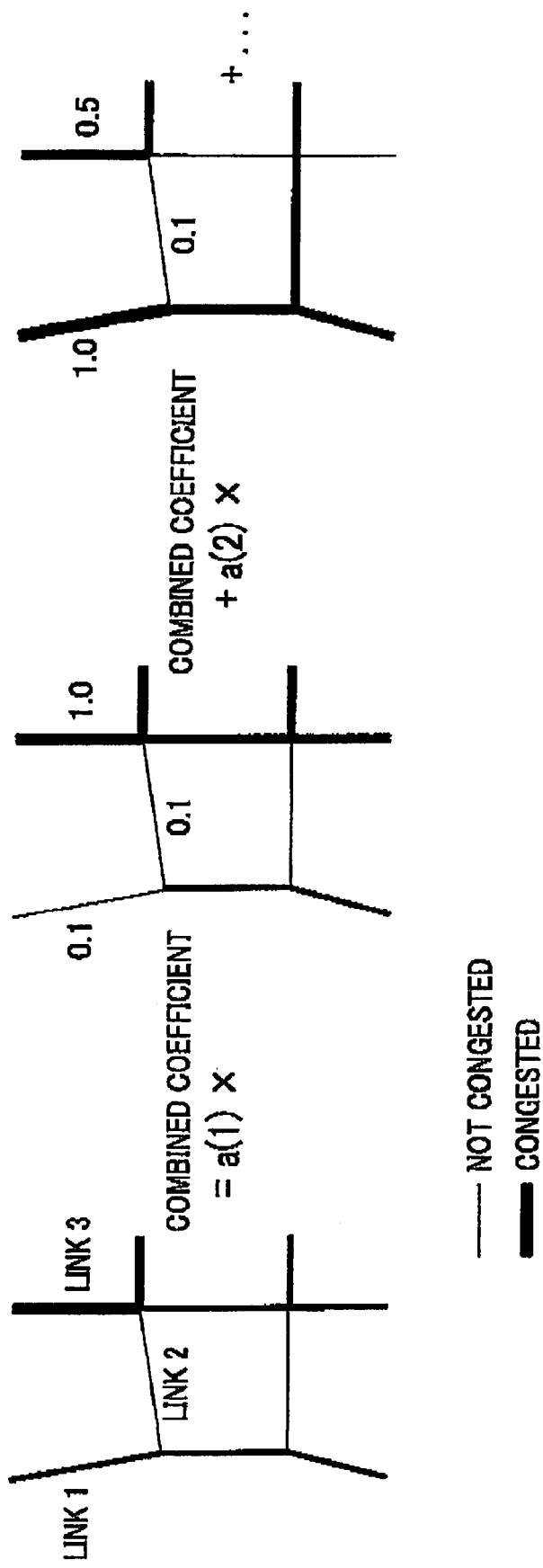
FIG. 2 is a schematic illustration in which probe data is expressed by a plurality of bases.

Herein, before describing the operation of the traffic information providing device of the first embodiment shown in FIG. 1, the basic concept of the principal component analysis with missing data in the present embodiment will be described with reference to FIG. 2. FIG. 2 is a schematic illustration in which probe data is expressed by a plurality of bases.

In FIG. 2, the left side of the equation represents the traffic information (herein specified as travel time) at a plurality of links (the link 1 to link 3) at a certain moment, the value of the links being expressed by the thickness of lines; and while the right side of the equation represents a plurality of bases. The traffic information at the certain moment are obtained by linearly combining the plurality of bases. On the right side of the equation, each of the bases (basis W(1), basis W(2)) is constituted by the components of traffic information which vary in relation to one another among the links, and the combined coefficient of each of the bases varies without relating to one another. By expressing the traffic information in such a manner, the tendency of the traffic conditions of the plurality of links can be expressed by the value of the combined coefficient of each of the bases.

For example, when the components of the link 1, link 2 and link 3 on the basis W (1) are expressed as $[1_{11}, 1_{12}, 1_{13}]=[0.1, 0.1, 1.0]$, it means that there are components varying in a proportional relationship of "1:1:10" contained in the traffic information of the links 1 to 3. further, when the components of the link 2, link 2 and link 3 on the basis W (2) are expressed as $[1_{21}, 1_{22}, 1_{23}]=[1.0, 0.1, 0.5]$, it means that, in addition to the components varying in the proportional relationship of "1:1:10" as mentioned above, there are also components varying in a proportional relationship of "10:1:5" contained in the traffic information of the links 1 to 3.

Further, the tendency of the traffic conditions of the links 1 to 3 can be expressed by the strength (i.e., the combined coefficient a (1) of the basis W (1)) of the components varying in the proportional relationship of "1:1:10" and the strength (i.e., combined coefficient a (2) of the basis W (2)) of the components varying in the proportional relationship of "10:1:5". For example, it can be known from the above that the link 1 is congested, the link 2 is not congested, and the link 3 is heavily congested. In other words, the traffic information at a certain moment can be expressed by a plurality of bases and combined coefficients. Variation of the bases expressing the correlation among such links is determined by the degree of the information amount (i.e., the number of the components) contained in the traffic information of the group of links.

At this time, the components of each basis are the factors. For example, on the basis W(1), the 0.1, 0.1 and 1.0 are factors respectively corresponding to the link 1, link 2 and link 3.

Figure 3:
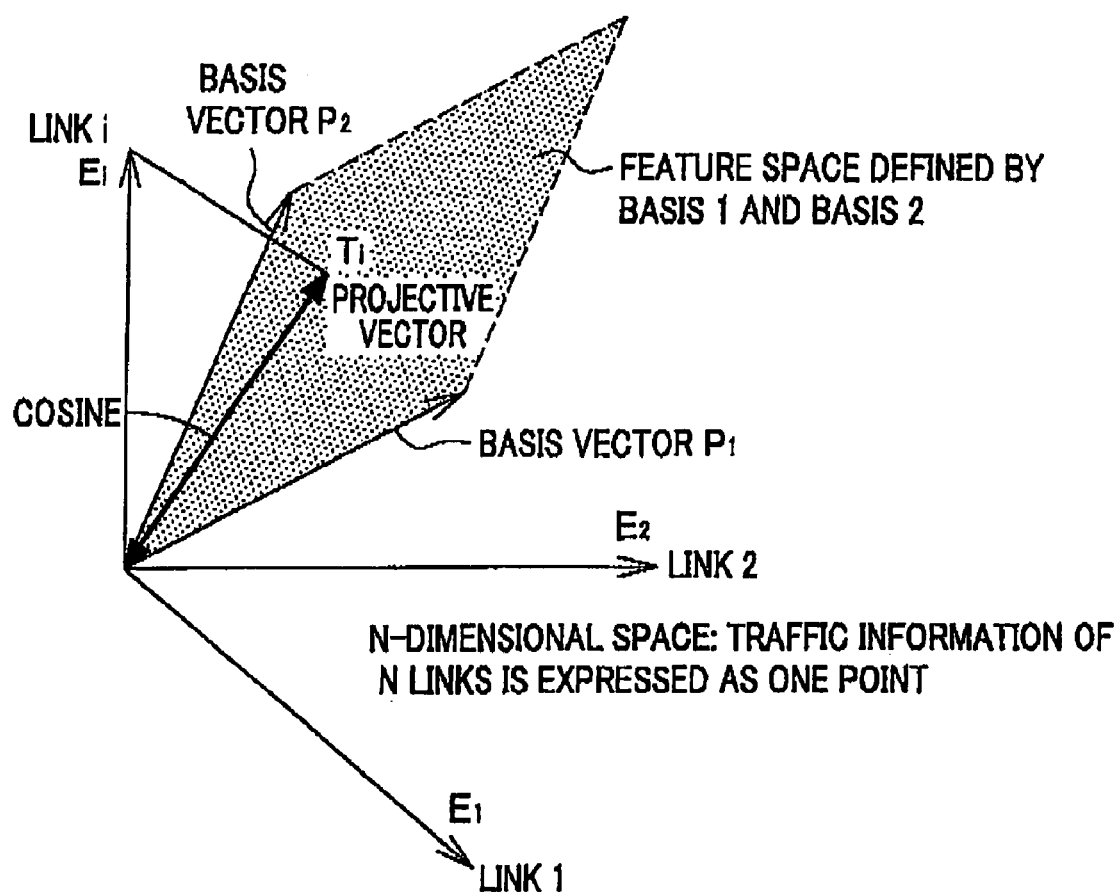
FIG. 3 is a schematic illustration in which the bases are respectively expressed in feature space coordinates.

FIG. 3 is a schematic illustration in which the bases are respectively expressed in feature space coordinates.

As shown in FIG. 3, when viewing the concept of the bases shown in FIG. 2 from the viewpoint of the feature space, the bases respectively represent axis vectors defining the feature space, and the combined coefficients correspond to coordinates in the feature space. In other words, the traffic information of the group of links at a certain moment as shown in FIG. 2 can be approximately expressed by one point in the feature space.

Conversely, even when there is a large amount of missing data in the current traffic information (like in the case of the probe data), as long as it is possible to project the current traffic information to one point in the feature space, the missing traffic information of the links can be estimated and interpolated by inversely projecting the one point in the feature space to an original traffic information data space (which is a N-dimensional space having N axes corresponding to N links). With such an estimation and interpolation method which uses the projection to the feature space, since estimated value for each of components varying in relation to one another among the plurality of links is calculated, the traffic information, which is observed as a complicated phenomenon where many factors are overlapped with each other, can be suitably interpolated.

In FIG. 3, the basis m (m represents integer from 1 to M) is expressed by a basis vector $Pm=[p_{m1}, p_{m2}, \ldots, p_{mN}]$. Such a component expression is called as a "link coordinate system". Similarly, when being expressed by the link coordinate system, the unit vector of the link i is expressed as $Ei=[0, 0, \ldots, 1, 0, \ldots, 0]$, in which only the ith factor is 1, and the remaining factors are 0.

In this case, since the basis vector Pm (m=1 to M) is an orthonormal basis with respect to the feature space defined by basis 1 to basis M (the shaded parallelogram in FIG. 3), the projection point Ti of the unit vector of the link i is formed by inner product of the vector Ei and the basis vector Pm. Namely, $Ti=[P_1, P_2, \ldots, P_M]'Ei=P'Ei$ (in a M-dimensional feature space coordinate system). Herein, $P=[P_1, P_2, \ldots, P_M]$. When the projection point is expressed by an N-dimensional link coordinate system, $PTi=PP'Ei$.

Further, instead of performing filtering in accordance with the aforesaid method, the correlation filter 14 also can perform filtering in accordance with a method described below.

Incidentally, when the factors (i, j) of the projection matrix PP' are simply expanded, they will become $p_{1i}P_{1j}+P_{Mi}$ $P_{2j} \ldots + p_{Mi}p_{Mj}$, and the matrix having $p_{mi}p_{mj}$ as factors can be expressed as $P_m P_m'$. Thus, $PP'=P_1P_1'+P_2P_2'+ \ldots +P_M P_M'$.

Herein, by using a spectral decomposition of the principal component analysis, a covariance matrix V of the links 1 to N can be decomposed and expressed as $V \approx \lambda_1 (P_1P_1')+\lambda_2 (P_2P_2')+ \ldots +\lambda_M(P_M P_M')$. Herein, $\lambda_m$ represents a variance of the data in the basis m. This expression is merely an expression obtained by weighting the variance $\lambda_m$ to form each basis vector $P_m$ constituting the projection matrix PP'. Taking advantage of this nature of the spectral decomposition, the correlation filter 14 shown in FIG. 1 can perform filtering to determine whether or not the missing data can be estimated and interpolated by using the norm of the projective vector $\{\lambda_1(P_1P_1')+\lambda_2P_2P_2')+ \ldots +\lambda_M(P_M P_M')\}$ E i weighted by the variances, instead of using the norm of the projective vector PP'Ei (i.e., the projective norm).

By using the spectral decomposition of the principal component analysis, it is possible to perform filtering while more focusing on the bases having large variance.

Figure 4:
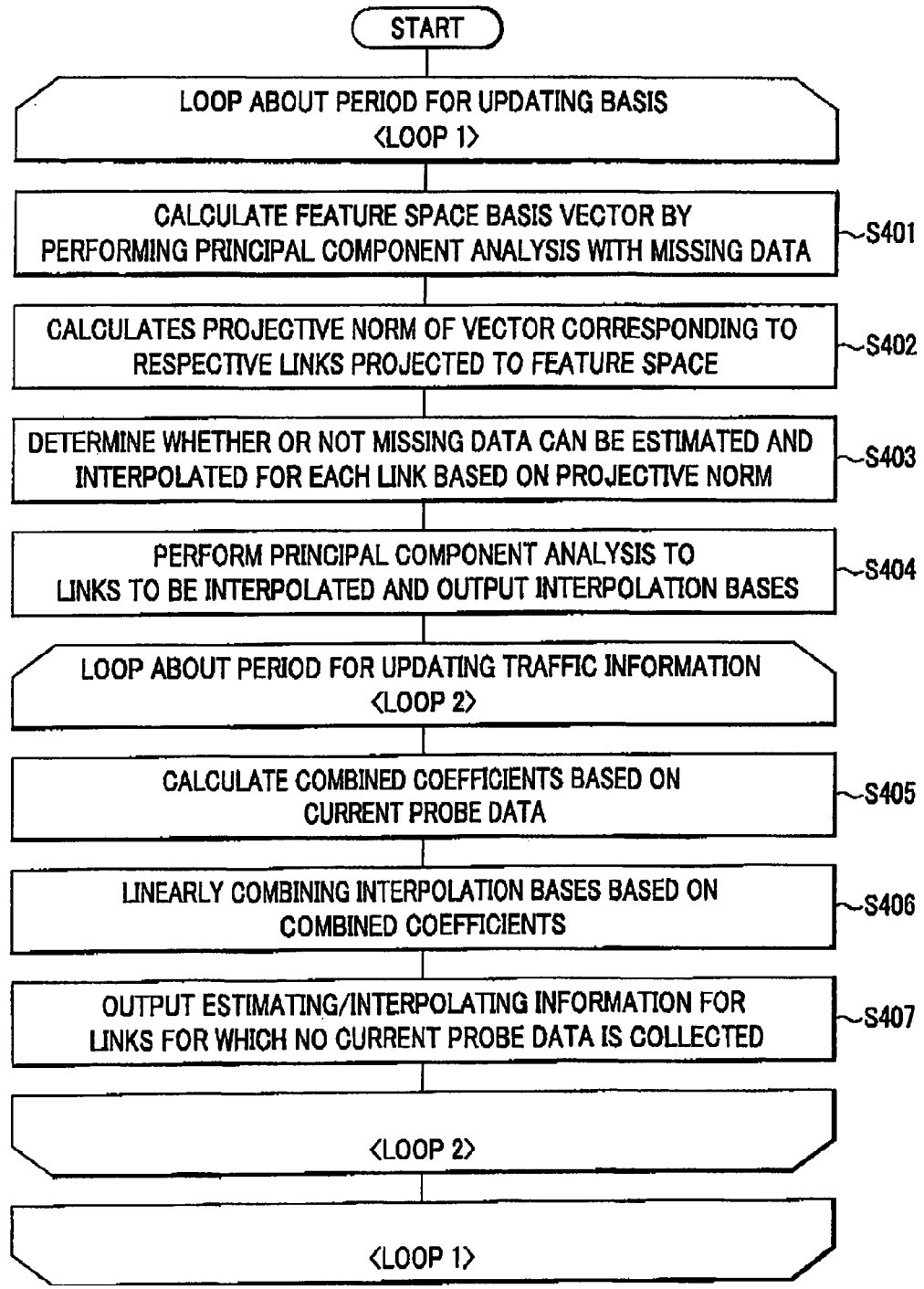
FIG. 4 is a flowchart explaining the operation of the traffic information providing device according to the first embodiment.

FIG. 4 is a flowchart explaining the operation of the traffic information providing device according to the first embodiment.

Operation of the traffic information providing device of the first embodiment as shown in FIG. 1 will be described below with reference to the flowchart of FIG. 4.

First, the filter basis calculating device 12 reads out the probe data history from the past probe data database 11. Incidentally, the period of the data to be read out can be arbitrarily set (for example, the period of the data can be set to a week, a month, etc.), taking in consideration the factors which will affect the bases such as change in road structure, change in season, change in day of the week, peculiar congestions caused by accident, construction and the like. Further, the read out probe data history needs to be sorted in accordance with the categories of the traffic information. Since the link travel time and the link mean speed can be converted into each other by using the link length, and since the degree of traffic congestion can be roughly calculated from the link mean speed, the link travel time herein is taken as an example of the probe data history.

Further, the filter basis calculating device 12 acquires the probe data history, performs principal component analysis with missing data to obtain the components of traffic information which vary in relation to one another among a plurality of links, calculates the components of traffic information as the feature space basis vectors (i.e., as the bases for the filter for the group of links), and outputs the calculated feature space basis vectors to the projective norm calculating device 13 (Step S401).

Further, the projective norm calculating device 13 generates the feature space with the feature space basis vectors output by the filter basis calculating device 12 as axis vectors (axes), calculates the projective norm of the projective vector formed by projecting the vector corresponding to respective links to the feature space, and outputs the calculated projective norm to the correlation filter 14 (step S402). The projective norm can be calculated by calculating the angle between vector (which expresses the links) and the feature space and obtaining the cosine of the vector by using the calculated angle.

The correlation filter 14 determines whether or not the missing data can be estimated and interpolated for each link by comparing the projective norm and the interpolation threshold value (Step S403), generates the list of links to be interpolated (i.e., the list of the links whose projective norm exceeds the interpolation threshold value) based on the determining result, and outputs the generated list to the interpolation basis calculating device 15. Incidentally, the interpolation threshold value is determined by the number of the feature space basis vectors output by the filter basis calculating device 12.

The details of how to determine whether or not the missing data can be estimated and interpolated will be described below.

Note that the description here is based on general bases.

Each sample of the original data (snapshots in time series, i.e., the probe data at a certain moment) can be expressed by linearly combining the bases. In the linearly combining, the combined coefficients for respective bases are principal components, which represent the weights for the respective bases of the respective samples. Further, when considering the feature space whose axis vectors are the bases, the combined coefficients for the bases are merely the coordinates in the feature space.

The bases obtained by performing principal component analysis are ranked in order from high to low. The higher the order of the basis is, the more major the component of the original data is (the major component means the component having a large amount of information, for example, the component in which the traffic information of a plurality of links changes in the same trend), and the lower the order of the basis is, the more minor the component of the original data is (examples of the minor component include noise contained in one single link). In other words, the more the number of the bases is, the higher the possibility that the original information is reproduced in detail (which means a high restoration rate, i.e., a high accumulated proportion) is. At this time, the projective norm of the unit vector projected to the feature space, which equal to the traffic information of each link, substantially equal to 1 for any link (which is, for example, a point projected to an x-y-z space).

On the other hand, if the number of the bases is limited to low (i.e., the dimension of the feature space is limited to low), since only the major components can be expressed, the projective norm in the feature space will approach zero unlimitedly for the links only having minor components (for example, in the case where a vector parallel to the z-axis is projected to the x-y plane). In contrast, for the link containing major components, the projective norm in the feature space has great value corresponding to such components (for example, in the case where a vector containing a lot of the x-axis components and y-axis components is projected to the x-y plane).

In brief, when the number of the bases is increased, since noise-like minor components are also expressed, even the projective norm in the feature space defined by the bases which show less correlation becomes great. Thus, the interpolation threshold value for the projective norm is set high accordingly, so that the link having the projective norm higher than the interpolation threshold value is determined not to be noise-like link and therefore is determined to be interpolatable.

On the other hand, when the number of the bases is reduced, since the information amount expressed by the feature space reduces itself, the link that does not change in close correlation with other links can not obtain a large projective norm. Thus, the interpolation threshold value for the projective norm is lowered, so that the link containing more or less major components is determined to be interpolatable.

Thus, in order to exclude the link having only minor components, the more the number of the bases is, the higher the interpolation threshold value for the projective norm needs to be set.

Note that, when the interpolation threshold value is treated as a relative amount, the interpolation threshold value can be determined in the way mentioned above; and when the interpolation threshold value is treated as an absolute amount, the interpolation threshold value should be determined by performing tuning process when in actual use.

Herein, the accumulated proportion mentioned above is used as an indicator to determine the interpolation threshold value. The indicator shows how many percentages of the original information can be expressed by the bases. When the number of the bases is increased so that the accumulated proportion is close to 100% as mentioned above, the minor probe data which shows less correlation with other links also can be expressed.

Now return to FIG. 4.

The list of links to be interpolated generated by the correlation filter 14 lists the links whose projective norm exceeds the interpolation threshold value. The correlation filter 14 compares the projective norm with the interpolation threshold value and registers the list of links to be interpolated in the storage device (not shown), and at the same time outputs the list of links to be interpolated to the interpolation basis calculating device 15. The list of links to be interpolated lists at least link number (which is an ID unique for each link) and interpolatability code for each of the links whose projection norm exceed the interpolation threshold value. The correlation filter 14 performs such a process for all links located in the area where the traffic information is provided.

Herein, the interpolatability code indicates whether or not the missing data can be interpolated for each link (the result of the Step S403) in combination of 1 (interpolatable) and 0 (non-interpolatable) for each link ID.

Subsequently, among the traffic information of the links registered in the probe data history and stored in the past probe data database 11, the interpolation basis calculating device 15 performs the principal component analysis with missing data for the traffic information of the links to be interpolated registered in the list of links to be interpolated to obtain the components of the traffic information which vary in correlation with one another among the links to be interpolated, and outputs, as the interpolation bases for the group of links, the components of the traffic information to the combined coefficient calculating device 16 and the traffic information estimating device 17 (Step S404). In other words, the interpolation basis calculating device 15 selects the probe data histories of the link that can be interpolated among the probe data histories stored in the past probe data database, and performs the principal component analysis with missing data again for such probe data histories.

Incidentally, the links to be interpolated can be set changeable or unchangeable, regardless of the time and the day kinds. For example, the interpolation bases can be calculated corresponding to the time and the day kinds (for example, the day of the week, every fifth or tenth day of the month, a weekday/holiday, consecutive holidays, period of time while schools are closed, weather and the like), or the interpolation bases can be calculated without considering the time and the day kinds. However, when the interpolation bases are calculated corresponding to the time and the day kinds, a higher interpolation precision can be expected by selectively using the traffic information of the probe data histories corresponding to the time and the day kinds.

The processes of the steps S401 to S404 are performed within the loop 1 of the flowchart in FIG. 4. The loop 1 includes processes for determining the interpolation bases based on the past data, and is performed each time when updating the interpolation bases. For example, the loop 1 is performed at a period of one day or one week.

On the other, the loop 2 include processes for determining the combined coefficients (the estimated value) based on the current probe data and the interpolation bases, and calculating the estimated value of the traffic information by using the combined coefficient. The loop 2 is performed every time when the current probe data is collected or when the current probe data is provided.

Upon receiving a request for traffic information from the vehicle terminals, the combined coefficient calculating device 16 acquires the current probe data from the probe cars, calculates, based on the current probe data, the combined coefficient bases from the interpolation bases output by the interpolation basis calculating device 15, calculates the combined coefficient by performing the weighting projection, and outputs the calculated combined coefficient to the traffic information estimating device 17 (step S 405). The combined coefficient expresses the acquired current probe data as the sum of the calculated combined coefficient bases.

The details of the weighting projection are described in, for example, "*Linear Algebra and Its Applications*" (written by Gilbert Strang).

Herein, the combined coefficient bases are constituted by, among factors of the interpolation bases, only the factors corresponding to the links with no missing data in the current probe data.

Based on the combined coefficients output by the combined coefficient calculating device 16, the traffic information estimating device 17 linearly combines the interpolation bases output by the interpolation basis calculating device 15 and calculates the estimated value of the traffic information (the estimating/interpolating information) used for estimating and interpolating the links with missing current probe data (step S406).

Finally, the traffic information estimating device 17 outputs the estimating/interpolating information calculated in step S406 for the links for which no current probe data is collected (i.e., the links with missing traffic information) (step S407).

Incidentally, if the probe cars provide the current probe data at a period of five minutes, for example, the processes of the steps S405 to S407 are performed at a period of five minutes too.

According to the first embodiment of the present invention, by previously filtering the projection norm (which is considered as an indicator for determining whether or not the missing data can be estimated and interpolated) of the links in the feature space, estimation and interpolation is not performed to the links having less correlation with other links, so that it is possible to avoid a situation where the information (including the current information and the interpolated information) of specified link is apt to be missed.

Second Embodiment

Figure 5:
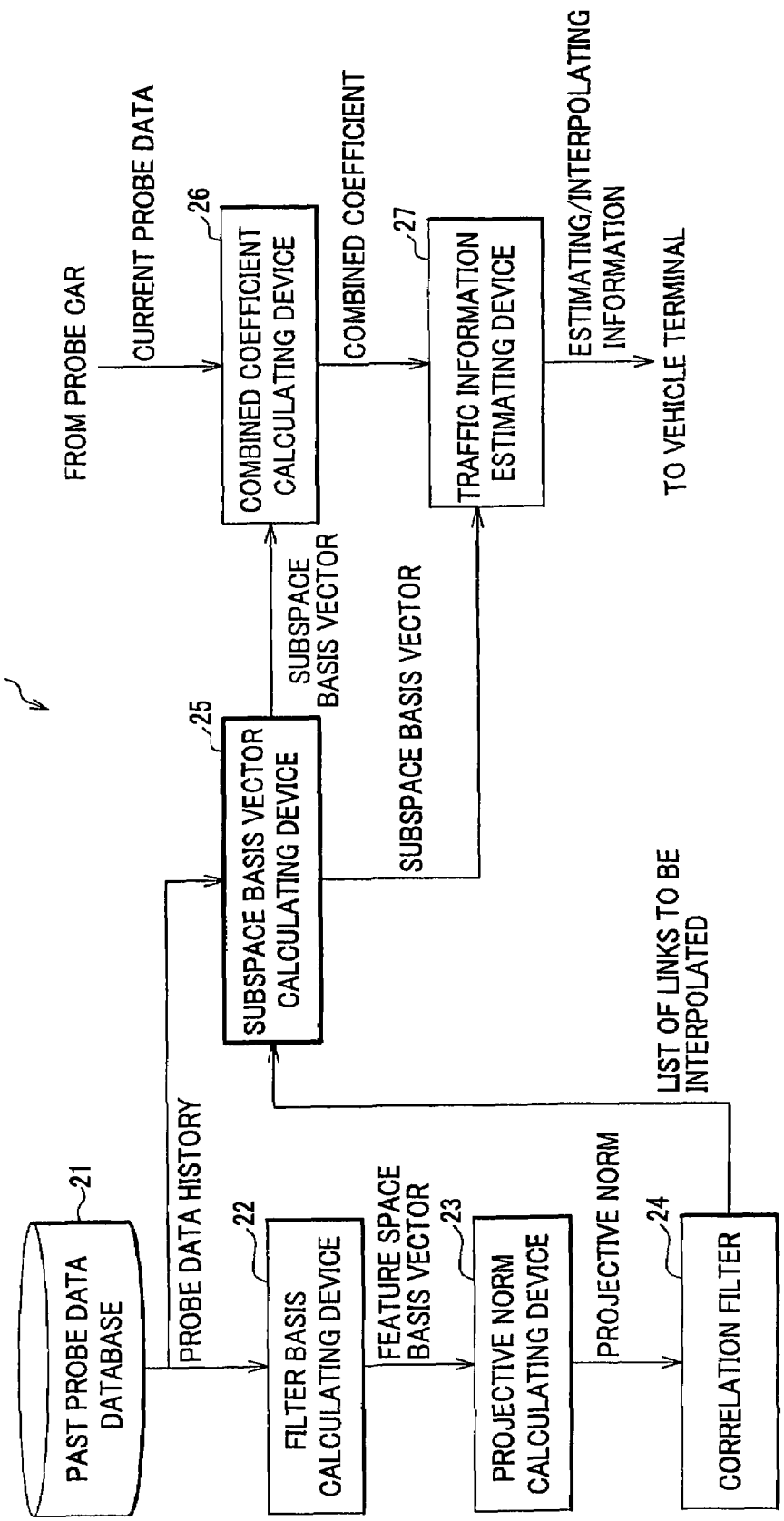
FIG. 5 is a block diagram showing the inner structure of a traffic information providing device according to a second embodiment of the present invention.
Figure 6:
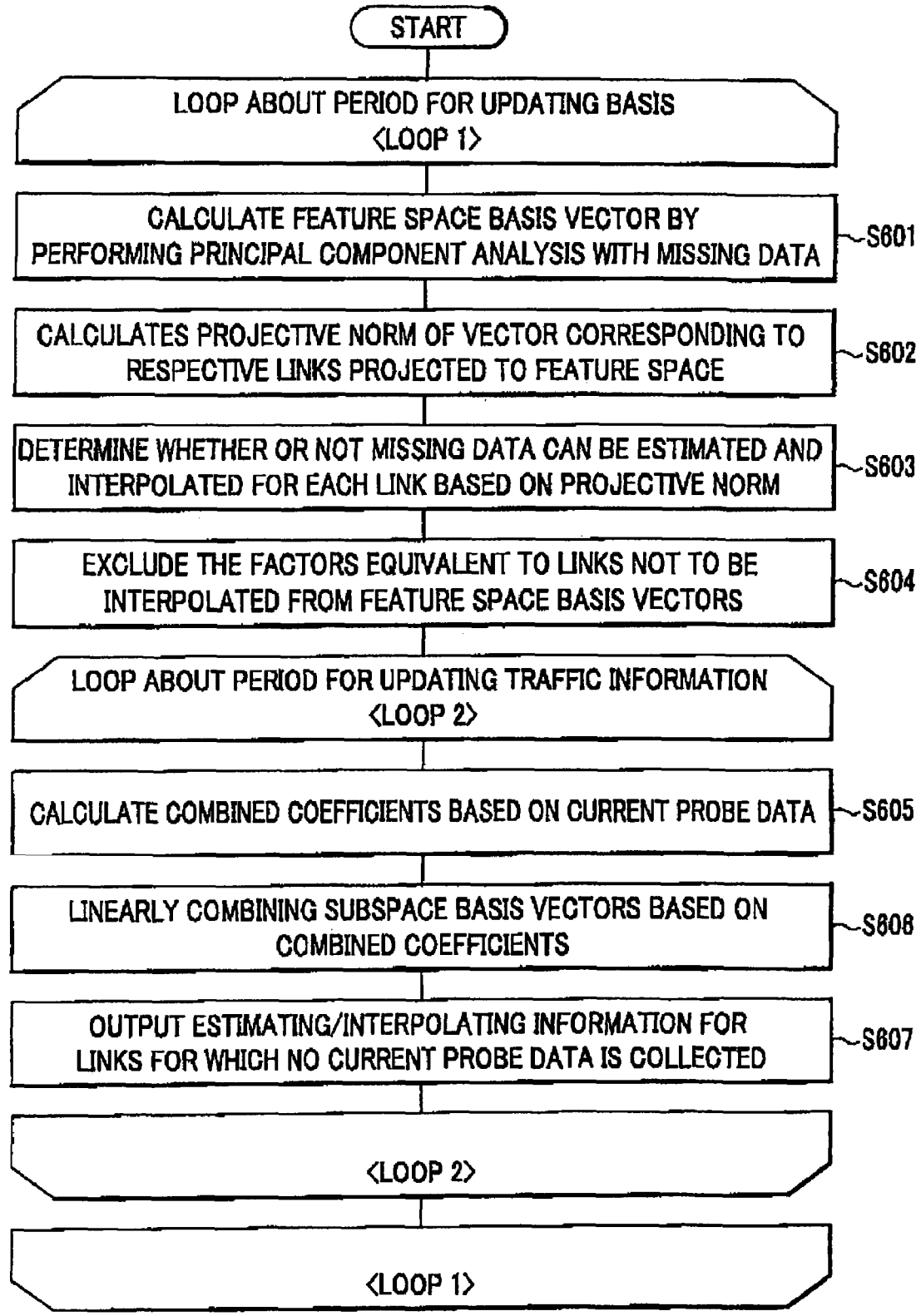
FIG. 6 is a flowchart explaining the operation of the traffic information providing device according to the second embodiment.

FIG. 5 is a block diagram showing the inner structure of a traffic information providing device according to a second embodiment of the present invention, and FIG. 6 is a flowchart explaining the operation of the traffic information providing device according to the second embodiment.

Note that, in the second embodiment, the description for the elements identical to the first embodiment will be skipped.

In FIG. 6, since the processes of the steps S601 to S603 are identical to those of the steps S401 to S403 of FIG. 4, the description thereof will be skipped.

The second embodiment shown in FIG. 5 differs from the first embodiment in that, instead of the interpolation basis calculating device 15 of the first embodiment, a subspace basis vector calculating device 25 is employed. The subspace basis vector calculating device 25 refers to the list of links to be interpolated output by a correlation filter 24, selects, from the links located in the area where the traffic information is provided, the links not registered in the list of links to be interpolated as "links not to be interpolated", generates interpolation subspace basis vectors by excluding the factors equivalent to the links not to be interpolated from the feature space basis vectors for the group of links, and outputs the interpolation subspace basis vectors to a combined coefficient calculating device 26 and a traffic information estimating device 27 (step S604 in FIG. 6).

The means of "excluding the factors equivalent to the links not to be interpolated from the feature space basis vectors for the group of links" will be explained below.

When there are a hundred of links located in the area where the traffic information is provided, each of the bases will be a 100-dimensional vector formed by a hundred factors. If the 100-dimensional vector can be expressed by five basis vectors, then the 100-dimensional vector will represent a 5-dimensional space defined by the five basis vectors.

In the second embodiment, among the one hundred of links, if the number of the links not to be interpolated is ten, then these factors (i.e., the factors corresponding to the links not to be interpolated) are excluded from the original space, so that the interpolation is performed in a 90-dimensional space by using a 5-dimensional feature space.

The difference between the second embodiment and the first embodiment will be briefed below.

In the first embodiment, based on the feature space basis vectors calculated in the step S401 (see FIG. 4), the correlation filter 14 selects the links to be interpolated, and the interpolation basis calculating device 15 performs the principal component analysis again by using the probe data history of the links to be interpolated selected by the correlation filter 14 to calculate the interpolation bases from which the influence of the links not to be interpolated is eliminated.

While in the second embodiment, the correlation filter 24 performs the same processes as in the first embodiment based on the feature space basis vectors calculated in the step S601 until the time when it selects the links to be interpolated. The point different from the first embodiment is that, in the second embodiment, the subspace basis vector calculating device 25 excludes the factors corresponding to the links not to be interpolated (which are obtained as a result of performing the above process) from the factors of the feature space basis vectors calculated in the step S601. In other words, in the second embodiment, the traffic information providing device does not perform the principal component analysis for second time as in the first embodiment.

Figure 9:
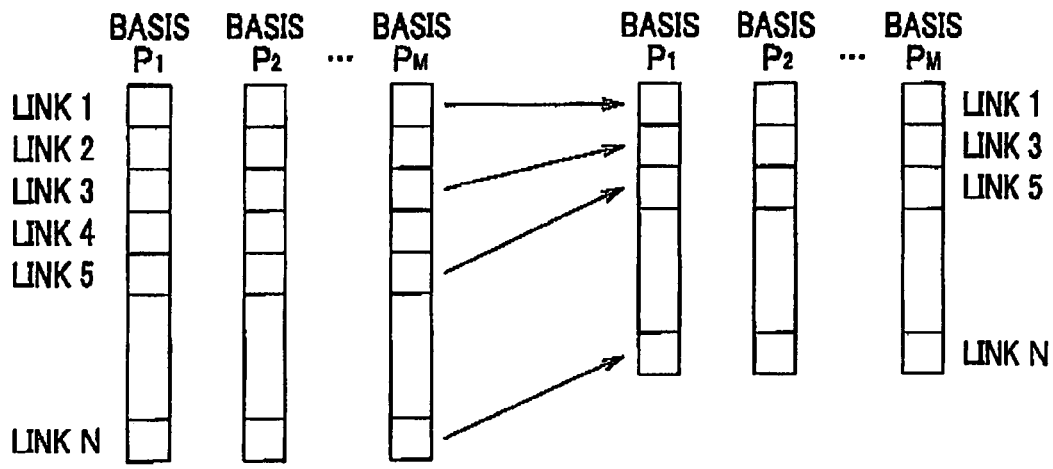
FIG. 9 is a schematic illustration explaining how subspace basis vectors are extracted, of which part (a) shows the relation between feature space basis vectors and the links before filtering is performed, and part (b) shows the relation between the feature space basis vectors and the links after filtering is performed.

The details about the process of extracting the subspace basis vectors will be described below with reference to part (a) and part (b) of FIG. 9. FIG. 9 is a schematic illustration explaining how subspace basis vectors are extracted, of which part (a) shows the relation between the feature space basis vectors and the links before filtering is performed, and part (b) shows the relation between the feature space basis vectors and the links after filtering is performed. Herein, the process is explained based on an example in which the link 2 and link 4 are excluded from the links to be interpolated.

As shown in FIG. 9, each of the feature space basis vectors (bases $P_1$ to $P_M$) is expressed as an N-dimensional vector before filtering is performed, however, after filtering is performed, the number of the feature space basis vectors does not change while number of the factors of each basis is reduced to (N−2).

Herein, the total number of the links used to form the feature space basis vectors is N. In the example shown in FIG. 9, since the link 2 and link 4 are selected to be the links not to be interpolated by using the projective norm, the vectors with these factors excluded form the subspace basis vectors which are used to interpolate the missing data.

The process of selecting the link 2 and link 4 as the links not to be interpolated is accomplished by determining whether or not the missing data can be interpolated for each link based on the projective norm (i.e., the process identical to the step S403 of FIG. 4).

According to the second embodiment of the present invention, the principal component analysis with missing data, which has to be performed by both the filter basis calculating device 12 and the interpolation basis calculating device 15 in the first embodiment, can be performed for only once by the filter basis calculating device 22 only. Thus, the calculation amount of the traffic information providing device can be reduced. Incidentally, although the subspace basis vectors output by the subspace basis vector calculating device 25 are not orthonormal bases, this will not affect the processes performed by the combined coefficient calculating device 26 and the traffic information estimating device 27.

Based on the current probe data obtained from the probe cars, the combined coefficient calculating device 26 calculates combined coefficient subspace basis vectors from the subspace basis vectors output by the subspace basis vector calculating device 25, and calculates the combined coefficients for the combined coefficient subspace basis vectors from the current probe data by performing the weighting projection (step S605 in FIG. 6).

Herein, the combined coefficient subspace basis vectors are constituted by, among factors of the subspace basis vectors, the factors corresponding to the links with no missing data in the current probe data.

Based on the combined coefficients output by the combined coefficient calculating device 26, the traffic information estimating device 27 linearly combines the subspace basis vectors output by the subspace basis vector calculating device 25 and calculates the estimated value (i.e., the estimating/interpolating information) used for estimating and interpolating the links with missing current probe data (step S606 in FIG. 6). Further, the traffic information estimating device 27 outputs the estimating/interpolating information calculated in the step S606 for the links for which no current probe data is collected (i.e., the links with missing traffic information) (step S607 in FIG. 6).

Incidentally, in FIG. 5, the filter basis calculating device 22, the projective norm calculating device 23, the correlation filter 24, the subspace basis vector calculating device 25, the combined coefficient calculating device 26 and the traffic information estimating device 27 serve as calculating devices, and the past probe data database 21 serves as a storage device.

Third Embodiment

Figure 7:
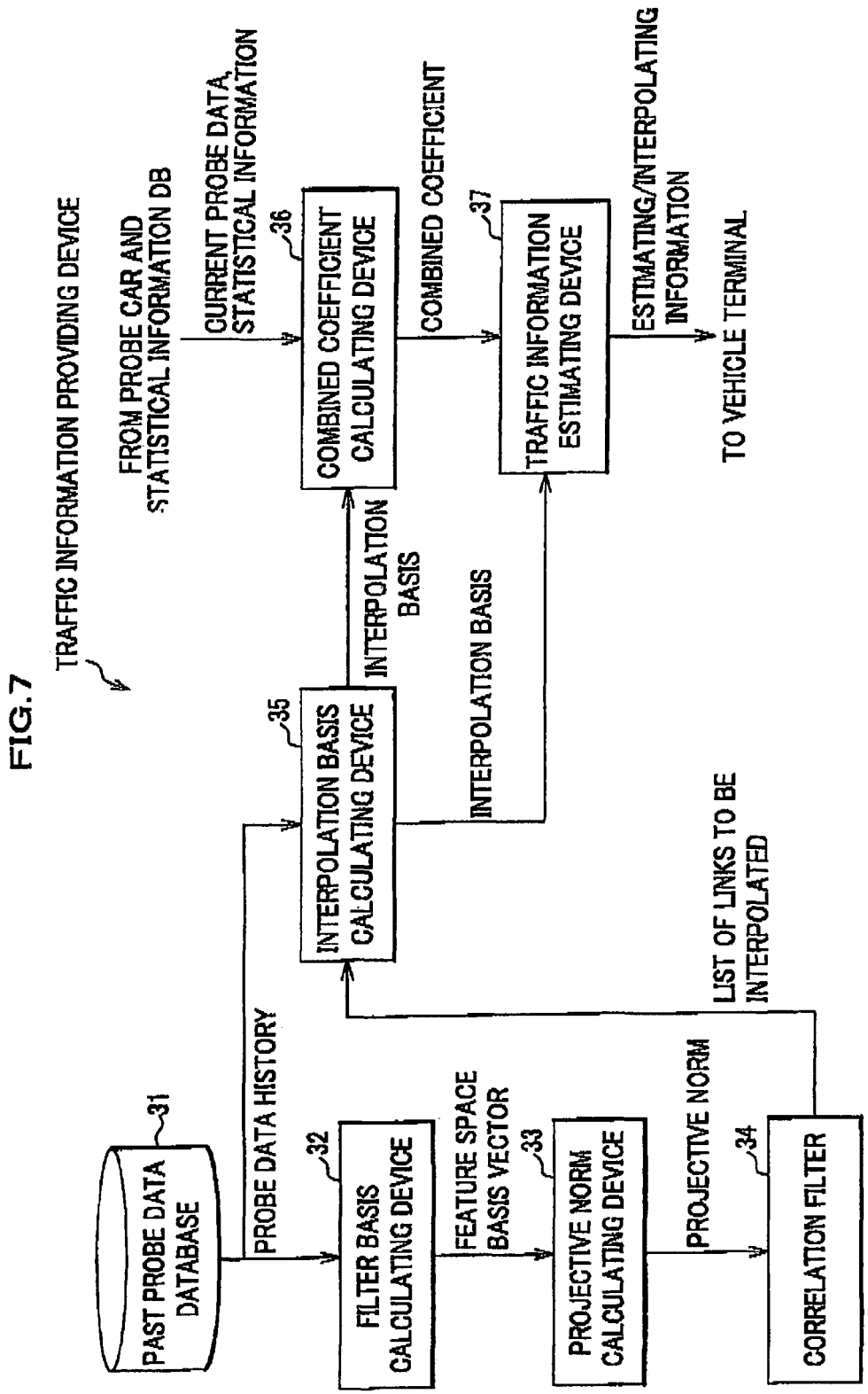
FIG. 7 is a block diagram showing the inner structure of a traffic information providing device according to a third embodiment of the present invention.
Figure 8:
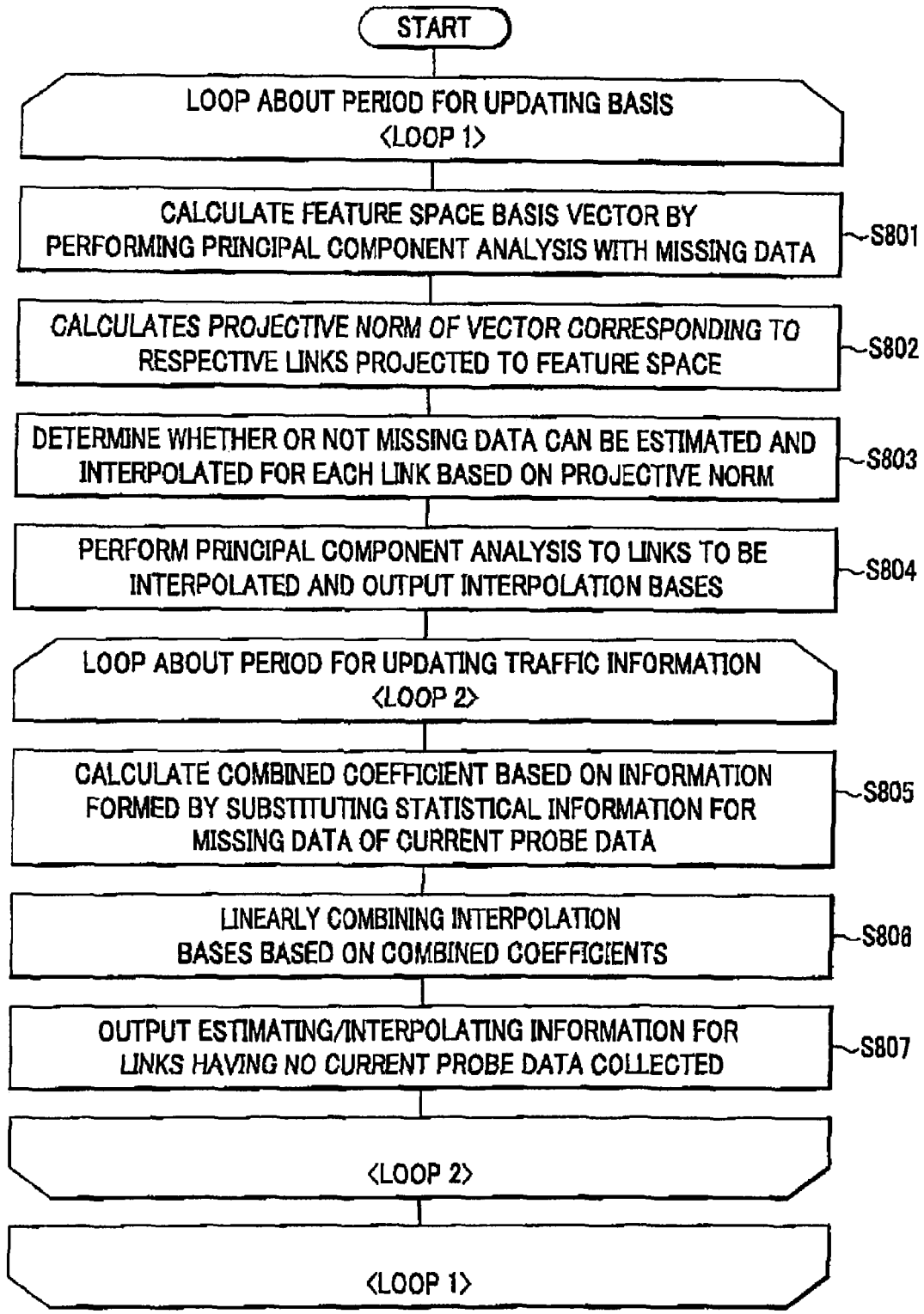
FIG. 8 is a flowchart explaining the operation of the traffic information providing device according to the third embodiment.

FIG. 7 is a block diagram showing the inner structure of a traffic information providing device according to a third embodiment of the present invention, and FIG. 8 is a flowchart explaining the operation of the traffic information providing device according to the third embodiment.

Note that, in the third embodiment, the description for the elements identical to the first embodiment will be skipped.

The third embodiment shown in FIG. 7 differs from the first embodiment shown in FIG. 1 in that not only the current information (i.e., the current probe data) but also statistical information acquired from a statistical information database (not shown) is input into the combined coefficient calculating device 36. Specifically, the current information whose missing data is interpolated with the statistical information is input into the combined coefficient calculating device 36. Further, the combined coefficient calculating device 36 calculates the weighting interpolation bases which perform weighting process to the interpolation bases, and calculates the combined coefficients based on the weighting interpolation bases. The remaining elements have the same structure as that of the first embodiment.

The statistical traffic information means the traffic information obtained by performing statistical processing (such as averaging processing) to the traffic information obtained in a certain condition.

The reason of why the statistical information should be used will be explained here. The process of determining one point in a feature space coordinate system from a mixture of the missing data and the current information (observed data) is merely a process of determining the combined coefficient of the linear combination by linearly combining a plurality of bases so that the observed data can be approximated by minimizing an error norm (the error here means the error between the observed data and the data obtained by linearly combining the plurality of bases).

Here, the statistical information can be, for example, downloaded from the traffic information center into a traffic information database (not shown) of the traffic information providing device and stored in the statistical traffic information database.

At this time, when the link 3, link 5, . . . are observed, the error norm represents the sum of the square of the approximate error of the observed data of each link whose observed data is obtained, i.e., the error norm can be expressed as "square error of the observed data of the link 3+square error of the observed data of the link 5+ . . . ". As for the link 1, link 2 and link 4 whose data is not observed, the error norm can be redefined as an expression of "square error of the link 3+square error of the link 5+ . . . +W×(square error of the link 1+square error of the link 2+square error of the link 3+square error of the link 4+ . . . )" by performing the weighting projection to the statistical information, instead of the missing data, with a weight W. By redefining the error norm in such a manner, the feature space coordinates can be determined based on the approximate error including the statistical information, so that, even when the amount of the observed data is small, the feature space can be determined in a stable manner without being affected by the small amount of the observed data.

On the other hand, since the object of the present embodiment is to perform the interpolation while reflecting the observed data obtained in real time, the weight W in the above arithmetic expression can be set to a suitably small value, so that it is possible to perform interpolation focusing on the observed data while maintain the stability.

Herein, the value of the weight W is obtained based on experiments.

Figure 10:
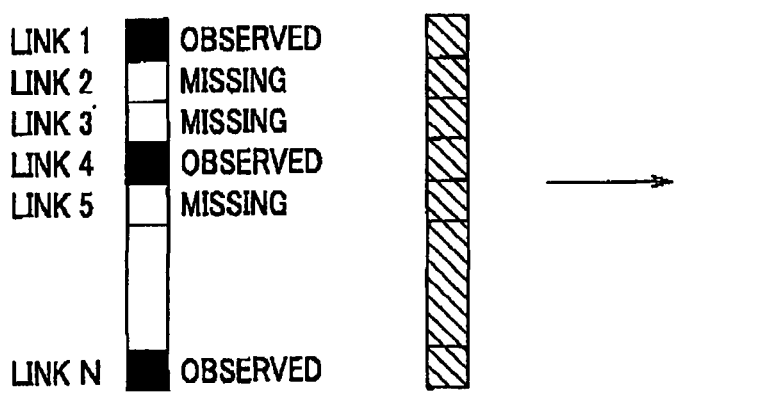
FIG. 10 is a schematic illustration explaining how current information and statistical information are merged with one another, in which the part (a) is the current information of each link, part (b) is the statistical information, and part (c) is merged information obtained by merging the current information with the statistical information input in a combined coefficient calculating device.

FIG. 10 is a schematic illustration explaining how the current information and the statistical information are merged with one another, in which the part (a) is the current information of each link, part (b) is the statistical information, and part (c) is merged information obtained by merging the current information with the statistical information input in the combined coefficient calculating device.

In FIG. 10, the black blocks represent the observed data, the blank blocks represent the missing data, and the hatched blocks represent the statistical information. As shown in FIG. 10, the merged information is formed by substituting the missing data in the current probe data with the statistical information. This process is performed by the combined coefficient calculating device 36.

FIG. 8 is a flowchart explaining the operation of the traffic information providing device according to the third embodiment with reference to FIG. 7.

Note that, in FIG. 8, since the processes of the steps S801 to S804 are identical to those of the steps S401 to S404 of FIG. 4, the description thereof will be skipped.

The combined coefficient calculating device 36 substitutes the missing data of the current probe data with the statistical information acquired from the statistical traffic information DATABASE, and calculates, based on this information, the combined coefficient (step S805). The combined coefficient is the weight of the weighting interpolation bases which perform weighting process to the interpolation bases output by the interpolation basis calculating device 35. Next, based on the combined coefficients output by the combined coefficient calculating device 36, the traffic information estimating device 37 linearly combines the interpolation bases output by the interpolation basis calculating device 35 and calculates the estimated value (i.e., the estimating/interpolating information) used for estimating and interpolating the links with missing probe data (step S806). Further, the weighting interpolation basis means the interpolation basis whose weight is changed by the factors obtained from the current probe data and the factors obtained from the statistical traffic information.

Finally, the traffic information estimating device 37 outputs the estimating/interpolating information calculated in the step S806 for the links for which no current probe data is collected (i.e., the links with missing traffic information) (step S807).

In the third embodiment, although the combined coefficient calculating device calculates the combined coefficient by using the interpolation bases output by the interpolation basis calculating device 35, the present invention is not limited thereto but includes an arrangement in which the combined coefficient calculating device calculates the combined coefficient by using the interpolation bases output by the subspace basis vector calculating device 25 (see FIG. 5) used in the second embodiment.

In such an arrangement, the step S804 in FIG. 8 is substituted with the step S604 in FIG. 6. Also, in the step S805 in FIG. 8, the combined coefficient calculating device 36 (see FIG. 7) substitutes the missing data of the current probe data with the statistical information acquired from the statistical traffic information database, excludes the factors equivalent to the links not to be interpolated from the substituted information, and calculates, based on the information with the links not to be interpolated excluded, the combined coefficients, which are weights of the weighting subspace basis vectors which perform weighting process to the subspace basis vectors output by the subspace basis vector calculating device 25. Further, the processes of the step S806 and the step S807 in FIG. 8 are substituted with those of the step S606 and the step S607 in FIG. 6.

Herein, the weighting to the subspace basis vectors is performed in the same manner as that in the third embodiment.

According to the third embodiment of the present invention, the combined coefficients can be calculated by the combined coefficient calculating device 36 in a stable manner, and the weight W of the statistical information is set to a small value with the current probe data. Thus, as processing performed by the combined coefficient calculating device 36 and the traffic information estimating device 37, the statistical information can be corrected with the observed data of the current probe data.

Incidentally, the traffic information providing device is equipped in the probe center server in the probe data center to perform communication with the probe terminals mounted on the probe cars, so that current probe data can be exchanged between the probe center server and the probe terminals.

As application of the first embodiment to third embodiment, the following paragraphs will describe a traffic information providing system which controls the upload of the current probe data in accordance with the possibility of the interpolation so that the current probe data can be uploaded efficiently.

First Embodiment of Traffic Information Providing System

Figure 11:
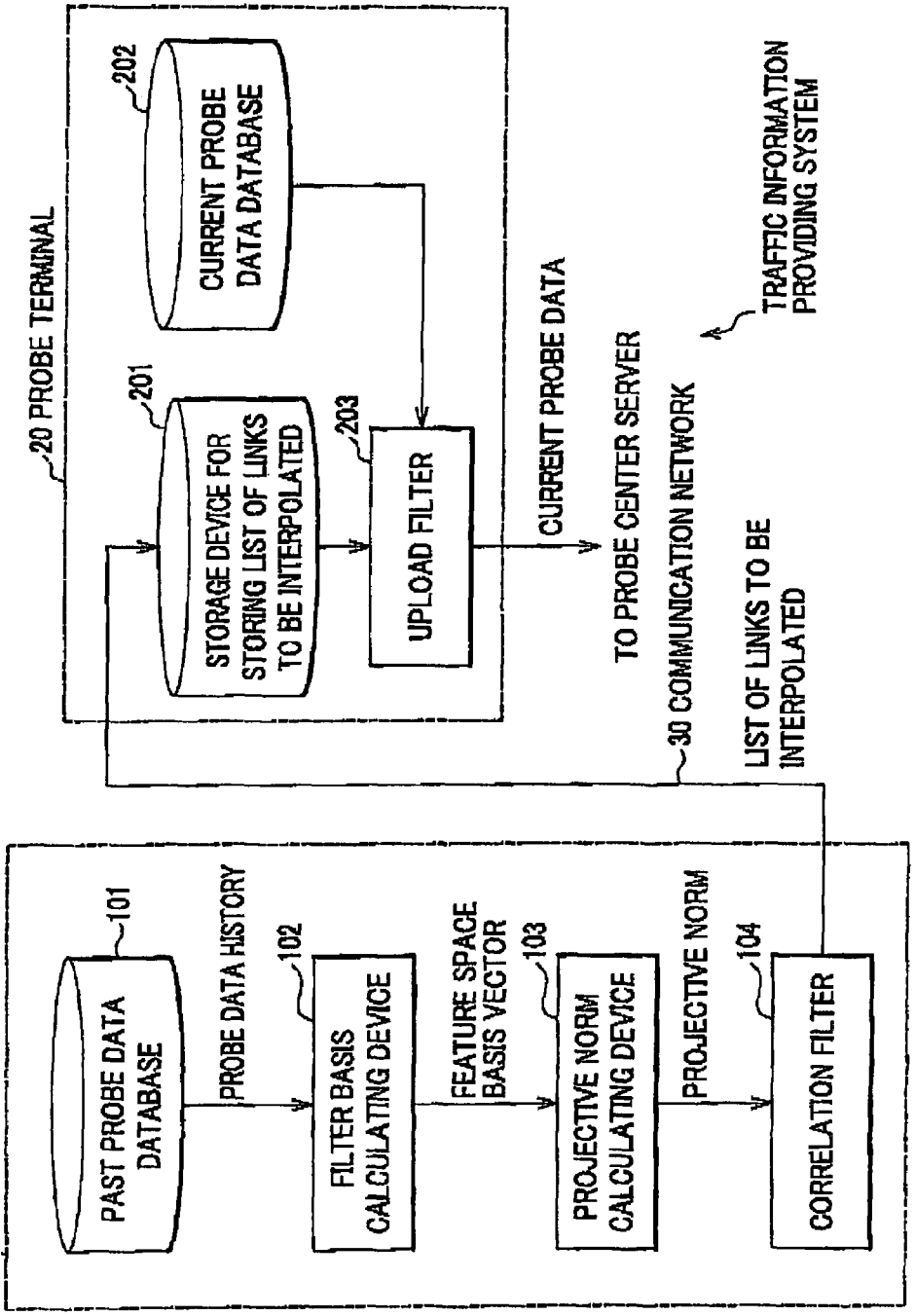
FIG. 11 is a block diagram showing an example of the structure of a traffic information providing system according to a first embodiment of a traffic information providing system.

FIG. 11 is a block diagram showing an example of the structure of a traffic information providing system according to a first embodiment of the traffic information providing system.

The traffic information providing system according to the first embodiment is configured by connecting a probe center server 10 (a traffic information providing device) with a plurality of probe terminals 20 through a communication network 30.

The probe center server 10 includes a past probe data database 101, a filter basis calculating device 102, a projective norm calculating device 103 and a correlation filter 104. Note that, the interpolation basis calculating device 15, 35, the combined coefficient calculating device 16, 26, 36 and the traffic information estimating device 17, 27, 37 as shown in FIGS. 1, 5 and 7 are configured in the same manner as shown in FIGS. 1, 5 and 7, though these elements are not be illustrated in FIG. 11.

As described before, the past probe data histories collected with respect to links in a specified area are stored in the past probe data database 101. Further, the filter basis calculating device 102 acquires the probe data histories with missing data of a plurality of links from the past probe data database 101, performs the principal component analysis with missing data so as to obtain components of traffic information which vary in relation to one another among the plurality of links, and outputs the obtained components of traffic information as bases of a feature space for the group of links to the projective norm calculating device 103. The projective norm calculating device 103 generates the feature space, which indicates correlation between the plurality of links, with the bases output by the filter basis calculating device 102 as axis vectors, calculates the norm of a projective vector in the feature space (i.e., the projective norm), and outputs the calculated projective norm to the correlation filter 14.

The correlation filter 104 determines, based on the projective norm of the projective vector output by the projective norm calculating device 103, whether or not the missing data can be estimated and interpolated for each link, and generates a list of links to be interpolated. The list of links to be interpolated generated by the correlation filter 104 is delivered to the probe cars (the probe terminals 20) which request the delivery of the traffic information through a communication device (not shown) provided in the probe center server 10.

Herein, the description will be given based on an assumption that the current probe data is uploaded to the probe cars (the probe terminals 20) which have issued an information request to the probe center server 10.

The probe terminal 20 includes a storage device 201 for storing the list of links to be interpolated, a current probe data database (as a storage device) 202, and an upload filter 203 (an upload filter device) serving both as a calculating device and a communication device.

List of links to be interpolated transmitted from the probe center server 10 is stored in the storage device 201 for storing the list of links to be interpolated. Incidentally, the list of links to be interpolated lists the link number and the interpolatability code (0: non-interpolatable, 1: interpolatable) for each link. Further, the current probe data from the recent past to the present (for example, the current probe data obtained in the last thirty minutes) for each link is stored in the current probe data database 202 (which is a traffic information storage device).

The upload filter 203 selects the current probe data (the probe data) by using the list of links to be interpolated stored in the storage device 201 for storing the list of links to be interpolated, and uploads the selected current probe data to the probe center server 10. The steps in which the upload filter 203 uploads the current probe data to the probe center server 10 are shown in FIG. 12.

Figure 12:
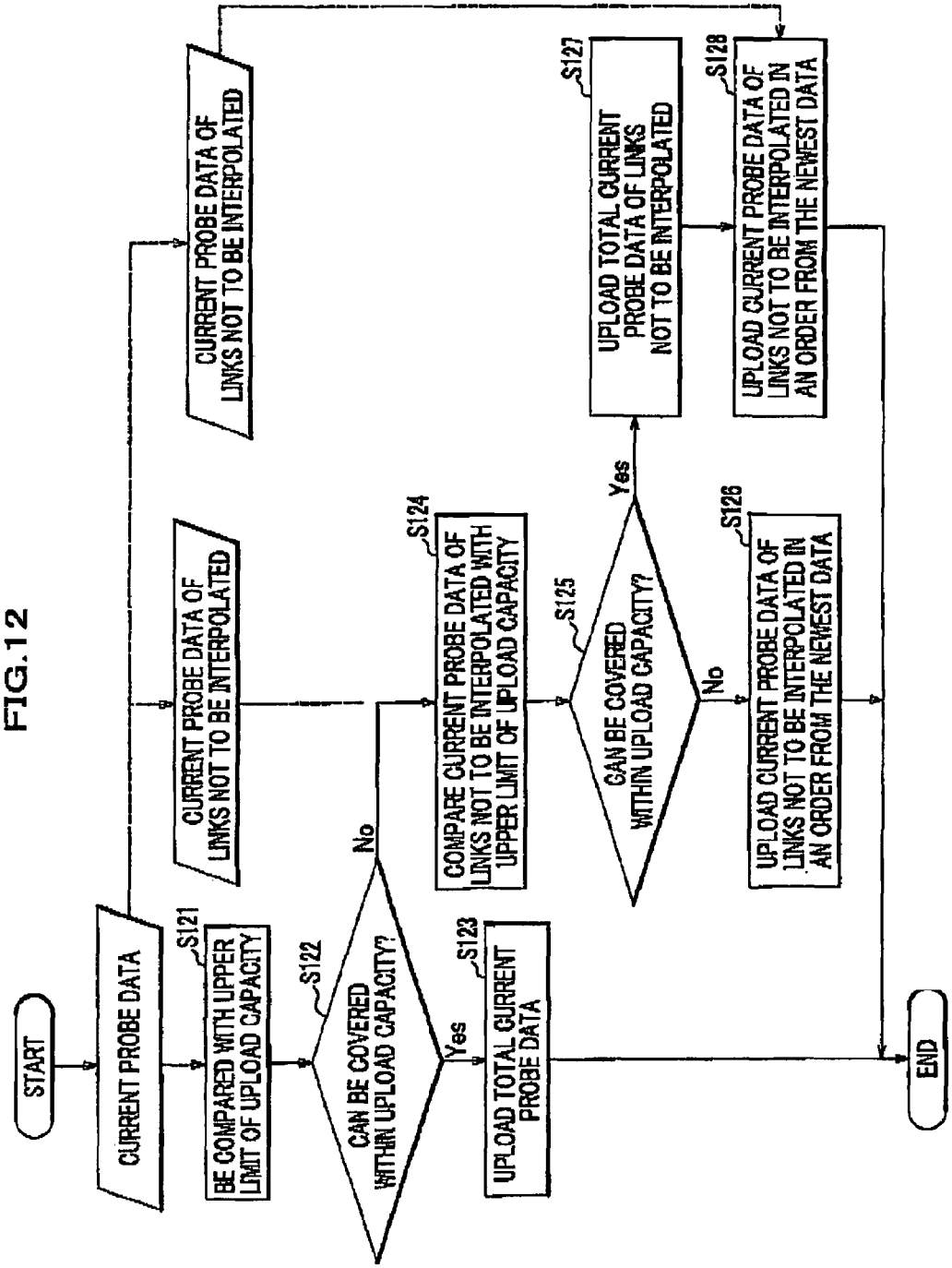
FIG. 12 is a flowchart explaining the operation of the traffic information providing system according to the first embodiment of the traffic information providing system.

FIG. 12 is a flowchart explaining the operation of the traffic information providing system according to the first embodiment.

Incidentally, at the timing when an upload notice for uploading the current probe data to the probe center server 10 is received, the upload filter 203 receives the list of links to be interpolated from the probe center server 10, and stores the received list of links to be interpolated in the storage device 201 for storing the list of links to be interpolated.

As shown in FIG. 12, when the probe terminal 20 issues a transmission request for transmitting the current probe data to the probe center server 10, the upload filter 203 refers to the current probe data collected by the probe terminal 20 and stored in the current probe data database 202, and determines whether or not the total transmitted current probe data can be covered by the upload capacity (step S122) by comparing the total transmitted current probe data with the upper limit of the upload capacity calculated by the probe terminal 20 based on the communication capacity, communication cost and the like (step S121). In the case where the total transmitted current probe data is less than the upper limit of the upload capacity (namely, in the case of "Yes" in step S122, which means that the total transmitted current probe data can be covered by the upload capacity), the upload filter 203 uploads the total transmitted current probe data in its entirety to the probe center server 10 (step S123).

While in the case where the total transmitted current probe data is more than the upper limit of the upload capacity (namely, in the case of "No" in the step S122, which means that the total transmitted current probe data can not be covered by the upload capacity), the upload filter 203 determines whether or not the total transmitted data not to be interpolated can be covered by the upload capacity (step S125) by comparing the current probe data of the links not to be interpolated (which is determined by referring to the list of links to be interpolated stored in the storage device 201 for storing the list of links to be interpolated) with the upper limit of the upload capacity (step S124). In the case where the current probe data of the links not to be interpolated can be covered by the upload capacity (namely, in the case of "Yes" in the step S125), the upload filter 203 uploads, among the current probe data stored in the current probe data database 202, the total current probe data of the links not to be interpolated to be interpolated to the probe center server 10 (step S127), and then, with the remaining upload capacity, the upload filter 203 uploads, among the current probe data stored in the current probe data database 202, the current probe data of the links to be interpolated to the probe center server 10 in an order from the newest such data (step S128). While in the case where the current probe data of the links not to be interpolated can not be covered by the upload capacity (namely, in the case of "No" in the step S125), the upload filter 203 uploads, among the current probe data stored in the current probe data database 202, the current probe data of the links not to be interpolated to be interpolated to the probe center server 10 in an order from the newest such data (step S126). When the uploaded current probe data reaches the upload capacity, the upload filter 203 stops the upload and terminates the processing.

Incidentally, in order to prevent link-bias generated when performing upload in the order from the newest data, it is necessary to provide a mechanism through which the links for being uploaded are dynamically notified by the probe center server 10 to the probe terminal 20 every time such an upload is performed. Specifically, a list of collected links of the current probe data/a list of uncollected links of the current probe data are also prepared in addition to the list of links to be interpolated/the list of links not to be interpolated, and a process for notifying a sum set of the list of links not to be interpolated and a list of uncollected current probe data to the probe terminal 20 is added as links for being uploaded.

Herein, since the links not to be interpolated can not be estimated and interpolated by using the other links, the traffic information of the links not to be interpolated can not be generated by the probe center server 10. Further, by using inverse number of the projective norm as priority, the upload filter 203 also can perform upload in the order from the highest priority, instead of based on the links to be interpolated/the links not to be interpolated.

Second Embodiment of Traffic Information Providing System

Figure 13:
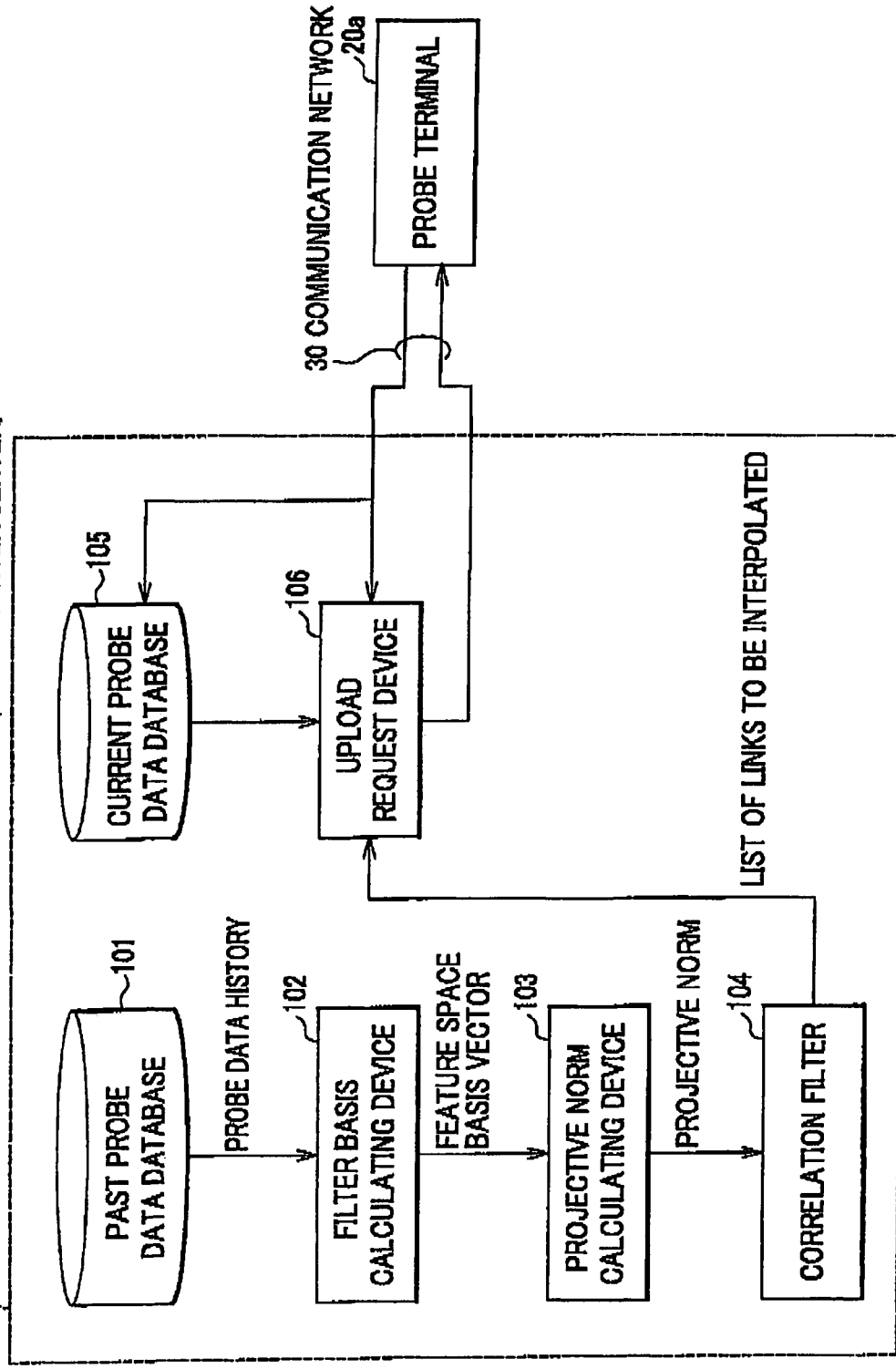
FIG. 13 is a block diagram showing an example of the structure of the traffic information providing system according to a second embodiment of the traffic information providing system.

FIG. 13 is a block diagram showing an example of the structure of a traffic information providing system according to a second embodiment of the traffic information providing system.

Note that, in the second embodiment, the description for the elements identical to the first embodiment will be skipped.

The second embodiment of the traffic information providing system differs from the first embodiment of the traffic information providing system in that, in the first embodiment shown in FIG. 11, the probe terminal 20 controls the number of the current probe data to be uploaded based on a static list of links to be interpolated, while in the second embodiment, a probe center server 10a controls the number of the current probe data to be uploaded based on a dynamic list of links to be interpolated.

Similar to the traffic information providing system of the first embodiment, the traffic information providing system according to the second embodiment is configured by connecting the probe center server 10a (the traffic information providing device) with a plurality of probe terminals 20a through the communication network 30.

The probe center server 10a is configured by adding a current probe data database 105 and an upload request device 106 to the probe center server 10 of the first embodiment shown in FIG. 11. The current probe data obtained in the last thirty minutes, for example, for links located in the specified area is stored in the current probe data database 105. Further, the upload request device 106 dynamically determines the links to be uploaded by using the list of links to be interpolated. The steps in which the upload request device 106 determines the links to be uploaded are shown in FIG. 12.

FIG. 14 is a flowchart explaining the operation of the traffic information providing system according to the second embodiment.

As shown in FIG. 14, upon receiving an upload notice for uploading the current probe data issues by the probe terminal 20a (step S141), the upload request device 106 refers to the current probe data stored in the current probe data database 105 within the probe center server 10a, and calculates an area cover ratio of the links to be interpolated (step S142). Then the upload request device 106 compares the area cover ratio with a preset upload threshold value of the links to be interpolated (an upper limit of communication capacity of the communication network) to determine whether or not the area cover ratio is equal to or less than the upload threshold value (step S143). Herein, the area cover ratio means, among a group of links in a specified area, the ratio of the links whose current probe data is collected within a predetermined time. The area cover ratio in the present embodiment means, among the links to be interpolated, the ratio of the links whose current probe data is collected within a predetermined time.

In the case where the upload request device 106 determines that the area cover ratio is equal to or lower than the upload threshold value (namely, in the case of "Yes" in the step S143) by comparing the area cover ratio with the upload threshold value, the upload request device 106 notifies the probe terminal 20a to preferentially transmit the upload of the current probe data of the links to be interpolated (steps S144, S145).

While in the case where the upload request device 106 determines that the area cover ratio is higher than the upload threshold value (namely, in the case of "No" in the step S143), the upload request device 106, calculates the area cover ratio of the links not to be interpolated (step S146). Herein, the area cover ratio of the links not to be interpolated means, among a group of links not to be interpolated in a specified area, the ratio of the links whose current probe data is collected within a predetermined time. Further, the upload request device 106 determines whether or not the area cover ratio of the links not to be interpolated is equal to or lower than the upload threshold value for the total links not to be interpolated (step S147). In the case where the area cover ratio of the links not to be interpolated is equal to or lower than the upload threshold value (namely, in the case of "Yes" in the step S147), the upload request device 106 notifies the probe terminal 20a to preferentially transmit the upload of the current probe data of the links not to be interpolated (steps S148, S145). In the case where the area cover ratio of the links not to be interpolated is higher than the upload threshold value (namely, in the case of "No" in the step S147), the upload request device 106 notifies the probe terminal 20a to preferentially transmit the upload of the current probe data of the links to be interpolated (steps S149, S145). Herein, the "to preferentially transmit . . . " means the current probe data of the links being mentioned is transmitted firstly, and then the current probe data of the links other than the links being mentioned is transmitted with the remaining communication capacity.

As mentioned above, with the traffic information providing systems according to the first and second embodiments, it is possible to control the collection of the current probe data between the probe center server 10, 10a and the probe terminal 20, 20a by using the list of links to be interpolated which shows whether or not the missing data of the links can be interpolated, so that the application range of the probe data can be efficiently widened by combining the actually measured data and the estimated and interpolated data. Thus, the probe center server 10, 10a provides priority control in accordance with the possibility of the interpolation.

Herein, the projective norm of the links in the feature space is used as the priority. If a link shows low correlation with other links, since the missing data of the link can not be estimated and interpolated based on the other links, the missing data will remain missing until being complemented by an actual measured data. Thus, the links having low correlation with other links are assigned high priority so that the data of these links can be preferentially collected. Further, the area cover ratio of the links having high correlation and the area cover ratio of the links having low correlation are both observed and the priority thereof is dynamically controlled. For example, the ratio of the data having to be kept is set to more than 20% for the links having high correlation because such links can be interpolated if there exists about 20% data, and more than 50% for the links having low correlation because such links can not be interpolated. In such a case, the priority is set to be a function of the inherent degree of correlation of the group of links and a function of the area cover ratio of the group of links.

Herein, the area cover ratio will be further discussed below. The area cover ratio means, when considering a certain area (i.e., meshes, prefectures, municipalities, highways and the like), the ratio of the roads whose current probe data is collected in the area in a given time window. The "ratio of the roads whose current probe data is collected" means the "ratio of the total length of the roads whose current probe data is collected" or the "ratio of the number of the links whose current probe data is collected", and herein the latter is adopted as the mean of the "ratio of the roads whose current probe data is collected".

For example, when considering the link data obtained in the last fifteen minutes as the current information, if twenty links among one hundred links have their data collected in the last fifteen minutes, then the area cover ratio is 20%.

Further, the probe terminals 20 which perform upload at the upload time mean the probe cars capable of uploading the traffic information. Specifically, the probe terminals 20 which perform upload at the upload time mean the probe terminals 20 which try to upload the traffic information. In order to constantly and dynamically control the data to be collected, the probe terminals 20 need to receive priority information each time when they try to perform upload.

On the other hand, if the above mentioned ratios (namely, the indicator of 20% for the links having high correlation and the indicator of 50% for the links having low correlation) are also practiced by using the probe terminal 20, then such an upload method can be adopted in which, in the last thirty minutes, for example, the current probe data should be uploaded so that the ratio mentioned above is satisfied. In such a case, the priority information can be used as fixed information until the degree of correlation (i.e., the determination of whether or not the data can be interpolated) is updated.

Incidentally, according to the above embodiments, although the list of links to be interpolated generated by the correlation filter 104 lists the combination of the link number and the interpolatability code for each link, the listed items also can be link numbers sorted for each interpolatability code, or the link number can be added as a parameter.

Further, in such a case, the interpolation threshold value that determines whether or not the missing data can be interpolated needs to be transmitted separately, and the interpolation threshold value can be such one in which, for example, a priority information (or priority rank) calculated from the projective norm is added to the link number.

In the aforesaid embodiments, as an indicator for determining whether or not a projection norm of the links in a feature space can be interpolated, filtering is previously performed, and the links that can not be interpolated is notified to the probe terminal, so that the probe terminal preferentially collects and uploads detected probe data for the links that can not be interpolated. Thus, the projective norm of the links to the feature space becomes the indicator for determining whether or not the missing data of the links can be interpolated, so that the degree of correlation of the of links can be determined previously, and further, the data for the links having low degree of correlation is preferentially collected so that area cover ratio of information providing can be widened.

Incidentally, the same advantages also can be obtained by the following configuration in which the filter basis calculating device 12, 22, 32, the projective norm calculating device 13, 23, 33, the correlation filter 14, 24, 34, the interpolation basis calculating device 15, 35, the subspace basis vector calculating device 25, the combined coefficient calculating device 16, 26, 36, and the traffic information estimating device 17, 27, 37 of the embodiments shown in FIGS. 1, 5 and 7 respectively having the function thereof programmed and stored in a storage device (not shown), and a computer sequentially reads out and executes the programs.

Further, the same advantages also can be obtained by the following configuration in which the filter basis calculating device 102, the projective norm calculating device 103, the correlation filter 104, the upload request device 106 and the upload filter 203 of the embodiments shown in FIGS. 11 and 13 respectively having the function thereof programmed and stored in the storage device (not shown), and a computer sequentially reads out and executes the programs.

What is claimed is:

1. A traffic information providing device for providing traffic information about links located in an area where the traffic information is provided, comprising:
    a filter basis calculating device which acquires a traffic information history with missing data of a plurality of links located in the area, the traffic information history containing at least the traffic information, performs principal component analysis with missing data for the traffic information contained in the traffic information history to obtain components of traffic information which vary according to correlation between the plurality of links, and outputs the obtained components as feature space basis vectors for a group of such links;
    a projective norm calculating device which generates a feature space with the output feature space basis vectors as axis vectors, the feature space indicating the correlation between the plurality of links, and calculates a projective norm, which is a norm of a projective vector formed by projecting a vector expressing the plurality of links to the feature space;
    a correlation filter which compares the calculated projective norm with an interpolation threshold value to determine, based on the result of the comparison, whether or not the missing data can be interpolated for each link, and generates and outputs a list of links to be interpolated which contains the information about the links to be interpolated;
    an interpolation basis calculating device which, among the traffic information contained in the traffic information history, performs the principal component analysis with missing data for the traffic information of the links to be interpolated to obtain components of traffic information which vary according to correlation between the traffic information of the links to be interpolated, and outputs the obtained components as interpolation bases for the group of links, the principal component analysis with missing data being performed to the links listed in the list of links to be interpolated;
    a combined coefficient calculating device which calculates combined coefficient bases based on both current traffic information acquired from a probe car and the interpolation bases, and calculates combined coefficients as weights for the combined coefficient bases; and
    a traffic information estimating device which calculates an estimated value of the traffic information of the links with missing current traffic information data by linearly combining the interpolation bases output by the interpolation basis calculating device.

2. The traffic information providing device according to claim 1,
    wherein the correlation filter determines whether or not the missing data can be interpolated based on an interpolation threshold value determined by the number of the feature space basis vectors output by the filter basis calculating device.

3. The traffic information providing device according to claim 1,
    wherein the combined coefficient calculating device acquires traffic information formed by substituting statistical information for the missing data of the current traffic information, calculates weighting interpolation bases, which performed weighting process to the components of the interpolation bases, based on the traffic information formed by substituting the statistical information for the missing data, and calculates the combined coefficients based on the traffic information formed by substituting the statistical information for the missing data and the calculated the weighting interpolation bases.

4. The traffic information providing device according to claim 1, further comprising:
    an upload request device which refers, upon receiving an upload notice issued by a probe terminal connected via a communication network, to the current traffic information, calculates an area cover ratio of links to be interpolated, which represents a percentage of the links to be interpolated whose current traffic information is collected over a predetermined time period among the group of links located in a certain area, and compares the calculated area cover ratio of links to be interpolated with an upload threshold value of the links to be interpolated, which represents an upper limit of a preset communication capacity of the communication network, to determine whether or not the area cover ratio is smaller than the upload threshold value, notifies, if the area cover ratio is smaller than the upload threshold value, the probe terminal to preferentially upload the current traffic information of the links to be interpolated, calculates, if the area cover ratio is greater than the upload threshold value, the area cover ratio of the links not to be interpolated, determines whether or not the area cover ratio of the links not to be interpolated is smaller than the upload threshold value, notifies, if the area cover ratio of the links not to be interpolated is smaller than the upload threshold value, the probe terminal to preferentially upload the current traffic information of the links not to be interpolated to the traffic information providing device, and notifies, if the area cover ratio of the links not to be interpolated is greater than the upload threshold value, the probe terminal to preferentially upload the current traffic information of the links to be interpolated to the traffic information providing device.

5. A traffic information transmission method in a traffic information providing system configured by connecting a probe terminal, which includes at least a calculating device, a storage device and a communication device, with a traffic information providing device, which includes at least a calculating device and a storage device, via a communication network, the calculating device of the traffic information providing device performing the steps of:

acquiring a traffic information history with missing data of a plurality of links located in a predetermined area, the traffic information history containing at least traffic information, performing principal component analysis with missing data for the traffic information contained in the traffic information history to obtain components of traffic information which vary according to correlation between the plurality of links, and outputting the obtained components as feature space basis vectors for a group of such links;

generating a feature space with the output feature space basis vectors as axis vectors, the feature space indicating correlation between the plurality of links, and calculating a projective norm, which is a norm of a projective vector formed by projecting a vector expressing the plurality of links to the feature space;

comparing the calculated projective norm with an interpolation threshold value to determine, based on the result of the comparison, whether or not the missing data can be interpolated for each link, and generating a list of links to be interpolated which contains the information about the links to be interpolated;

performing the principal component analysis with missing data for, among the traffic information contained in the traffic information history stored in the storage device, the traffic information of the links to be interpolated to obtain components of traffic information which vary according to correlation between the traffic information of the links to be interpolated, and outputting the obtained components as interpolation bases for the group of links, the principal component analysis with missing data being performed to the links listed in the list of links to be interpolated;

calculating combined coefficient bases based on both current traffic information acquired from the probe terminal and the interpolation bases, and calculating combined coefficients as weights for the combined coefficient bases; and calculating an estimated value of the traffic information of the links with missing current traffic information data by linearly combining the interpolation bases output by the interpolation basis calculating device, and the calculating device of the probe terminal performing the steps of:

receiving, at a timing when a transmission request for the traffic information is issued to the traffic information providing device via the communication device, the list of links to be interpolated from the traffic information providing device via the communication device, and storing the received list of links to be interpolated in the storage device; and referring to the traffic information collected by the probe terminal itself and stored in the storage device, comparing a traffic information capacity with the upper limit of an upload capacity calculated based on a communication capacity of the communication network, and, when the traffic information capacity is greater than the upper limit of the upload capacity, referring to the list of links to be interpolated stored in the storage device to preferentially transmit the traffic information of the links not to be interpolated to the traffic information providing device via the communication device.

6. A traffic information request method in a traffic information providing system configured by connecting a plurality of probe terminals with a traffic information providing device, which includes at least a communication device, a calculating device and a storage device, via a communication network, the calculating device of the traffic information providing device performing the steps of:

acquiring a traffic information history with missing data of a plurality of links located in a predetermined area, the traffic information history containing at least traffic information, performing principal component analysis with missing data for the traffic information contained in the traffic information history to obtain components of traffic information which vary according to correlation between the plurality of links, and outputting the obtained components as feature space basis vectors for a group of such links;

generating a feature space with the output feature space basis vectors as axis vectors, the feature space indicating the correlation between the plurality of links, and calculating a projective norm, which is a norm of a projective vector formed by projecting a vector expressing the plurality of links to the feature space;

comparing the calculated projective norm with an interpolation threshold value to determine, based on the result of the comparison, whether or not the missing data can be interpolated for each link, and generating a list of links to be interpolated which contains the information about the links to be interpolated;

performing the principal component analysis with missing data for, among the traffic information contained in the traffic information history, the traffic information of the links to be interpolated to obtain components of traffic information which vary according to correlation between the traffic information of the links to be interpolated, and outputting the obtained components as interpolation bases for the group of links, the principal component analysis with missing data being performed to the links listed in the list of links to be interpolated;

calculating combined coefficient bases based on both current traffic information acquired from the probe terminals and the interpolation bases, and calculating combined coefficients as weights for the combined coefficient bases;

referring, upon receiving a transmission request for transmitting the traffic information issued by the probe terminals via the communication device, to the current traffic information, calculating an area cover ratio of links to be interpolated, which represents percentage of the links to be interpolated whose traffic information is collected over a predetermined time period among the group of links located in the area, and comparing the calculated area cover ratio of links to be interpolated with an upload threshold value of the links to be interpolated, which represents an upper limit of a preset communication capacity of the communication network;

notifying, when the area cover ratio is smaller than the upload threshold value, the probe terminals via the communication device to preferentially transmit the current traffic information of the links to be interpolated to the traffic information providing device; and calculating, when the area cover ratio is greater than the upload threshold value, the area cover ratio of the links not to be interpolated, determining whether or not the area cover ratio of the links not to be interpolated is smaller than the upload threshold value, notifying, when the area cover ratio of the links not to be interpolated is smaller than the upload threshold value, the probe terminals via the communication device to preferentially transmit the current traffic information of the links not to be interpolated to the traffic information providing device, and notifying, when the area cover ratio of the links not to be interpolated is greater than the upload threshold value, the probe terminals via the communication device to preferentially transmit the current traffic information of the links to be interpolated to the traffic information providing device.

* * * * *